United States Patent
Crain, II et al.

(10) Patent No.: US 8,239,158 B2
(45) Date of Patent: Aug. 7, 2012

(54) SYNCHRONIZING A LOOP PERFORMED BY A MEASUREMENT DEVICE WITH A MEASUREMENT AND CONTROL LOOP PERFORMED BY A PROCESSOR OF A HOST COMPUTER

(75) Inventors: Charles E. Crain, II, Austin, TX (US);
Adam H. Dewhirst, Austin, TX (US);
Robert L. Ortman, Atlanta, GA (US)

(73) Assignee: National Instruments Corporation, Austin, TX (US)

(*) Notice: Subject to any disclaimer, the term of this patent is extended or adjusted under 35 U.S.C. 154(b) by 381 days.

(21) Appl. No.: 12/534,961

(22) Filed: Aug. 4, 2009

(65) Prior Publication Data

US 2010/0030509 A1   Feb. 4, 2010

Related U.S. Application Data

(60) Provisional application No. 61/086,070, filed on Aug. 4, 2008.

(51) Int. Cl.
*G06F 5/01* (2006.01)
*G06F 3/01* (2006.01)
*G06F 3/05* (2006.01)
*G06F 3/00* (2006.01)

(52) U.S. Cl. ......... 702/123; 702/119; 702/120; 702/125

(58) Field of Classification Search ............ 702/55, 702/85, 104, 123, 150, 155, 186, 189; 324/762.02; 345/418; 717/104
See application file for complete search history.

(56) References Cited

U.S. PATENT DOCUMENTS

| | | | |
|---|---|---|---|
| 4,914,568 A | 4/1990 | Kodosky et al. | |
| 5,481,741 A | 1/1996 | McKaskle et al. | |
| 5,646,521 A * | 7/1997 | Rosenthal et al. | 324/762.02 |

(Continued)

OTHER PUBLICATIONS

U.S. Appl. No. 11/103,286, entitled "Automatic Generation of Graphical Program Code for a Graphical Program Based on the Target Platform of the Graphical Program", by Ramprasad Kudukoli, Adam K. Gabbert, Hugo A. Andrade, Matthew E. Novacek, and Lukasz T. Darowski, filed on Apr. 11, 2005, 106 pages.

(Continued)

*Primary Examiner* — Michael Nghiem
*Assistant Examiner* — Felix Suarez
(74) *Attorney, Agent, or Firm* — Meyertons Hood Kivlin Kowert & Goetzel, P.C.; Jeffrey C. Hood; Jason L. Burgess

(57) ABSTRACT

Various embodiments of a system and method for performing a measurement application are described herein. The system may include a host computer having a processor, and a measurement device having a programmable hardware element. The programmable hardware element may be configured to perform a loop to acquire measurement data from a physical system. The host computer may be configured to perform another loop to read the measurement data from the programmable hardware element and use the measurement data in a measurement and control algorithm. The host computer may be further configured to perform a synchronization algorithm to keep the measurement data acquisition loop performed by the programmable hardware element synchronized with the measurement and control loop performed by the host computer.

21 Claims, 19 Drawing Sheets

U.S. PATENT DOCUMENTS

| | | | |
|---|---|---|---|
| 6,081,751 | A | 6/2000 | Luo et al. |
| 6,173,438 | B1 | 1/2001 | Kodosky et al. |
| 6,219,628 | B1 | 4/2001 | Kodosky et al. |
| 6,608,638 | B1 | 8/2003 | Kodosky et al. |
| 6,784,903 | B2 | 8/2004 | Kodosky et al. |
| 6,934,668 | B2 | 8/2005 | Kodosky et al. |
| 7,085,670 | B2 | 8/2006 | Odom et al. |
| 7,210,117 | B2 | 4/2007 | Kudukoli et al. |
| 7,315,791 | B2 | 1/2008 | Ilic et al. |
| 7,376,731 | B2 | 5/2008 | Khan et al. |
| 7,574,690 | B2 * | 8/2009 | Shah et al. .................... 717/104 |
| 7,849,449 | B2 | 12/2010 | Andrade et al. |
| 7,969,431 | B2 * | 6/2011 | Makowski et al. ........... 345/418 |

OTHER PUBLICATIONS

U.S. Appl. No. 12/713,017, entitled "Device Synchronization Using Independent Clocks", by Vincent A. Shouba, filed on Feb. 25, 2010, 51 pages.

"Using NI CompactRIO Scan Mode with NI LabVIEW Software"; National Instruments; 2008; 8 pages. Obtained from Internet: <ftp://ftp.ni.com/pub/devzone/pdf/tut_7338.pdf>.

"The RIO Scan Interface Under the Hood"; National Instruments; 2008; 6 pages. Obtained from Internet: <ftp://ftp.ni.com/pub/devzone/pdf/tut_7693.pdf>.

* cited by examiner

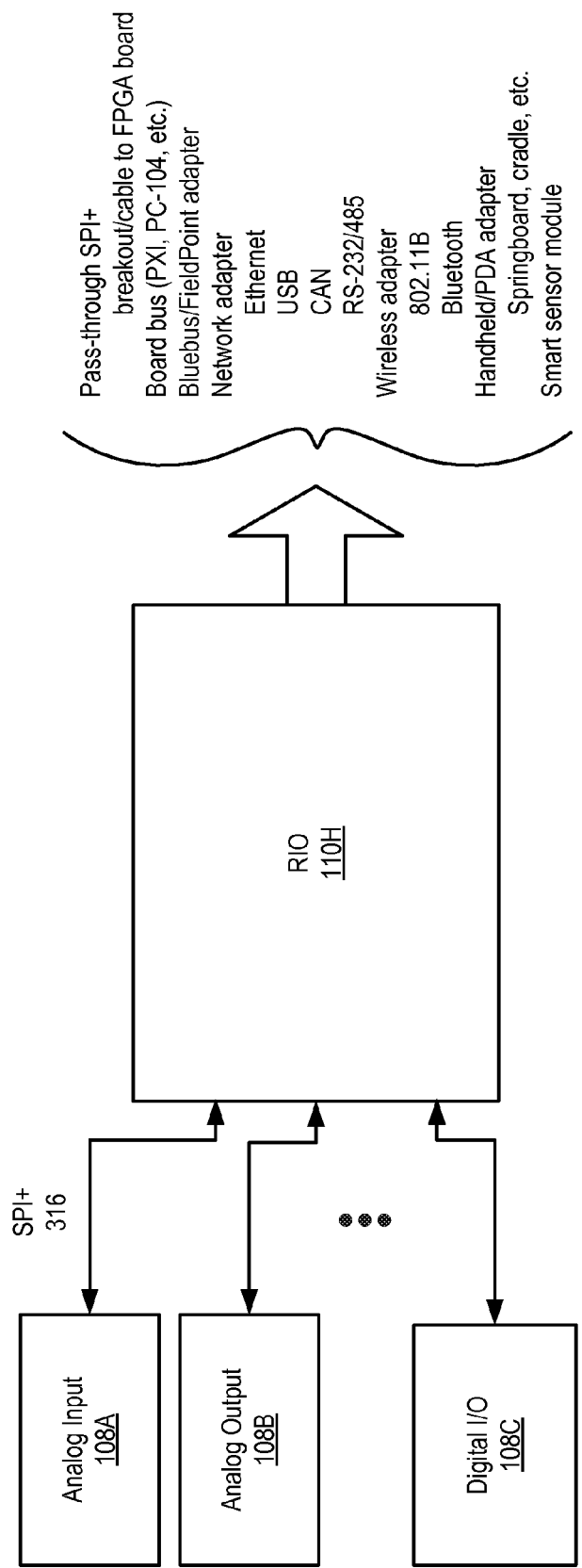

SYNCHRONIZING A LOOP PERFORMED BY A MEASUREMENT DEVICE WITH A MEASUREMENT AND CONTROL LOOP PERFORMED BY A PROCESSOR OF A HOST COMPUTER

PRIORITY CLAIM

This application claims priority to U.S. provisional patent application No. 61/086,070 titled "Synchronizing a Measurement Device with a Host Computer CPU in a Measurement and Control Loop" and filed Aug. 4, 2008, whose inventors were Charles E. Crain, Adam H. Dewhirst and Robert Ortman, and which is hereby incorporated by reference in its entirety as though fully and completely set forth herein.

FIELD OF THE INVENTION

The present invention relates to the field of computer-controlled measurement and control, and particularly to measurement devices with programmable logic for performing measurement and control functions. More particularly, the invention relates to synchronizing a loop performed by a programmable hardware element of a measurement device with another loop performed by a processor of a host computer system, where the loop performed by the programmable hardware element operates to produce measurement data, and where the loop performed by the processor operates to read the measurement data and use the measurement data to perform a measurement and control function.

DESCRIPTION OF THE RELATED ART

Scientists and engineers often use measurement or instrumentation systems to perform a variety of functions, including laboratory research, process monitoring and control, data logging, analytical chemistry, test and analysis of physical phenomena, and control of mechanical or electrical machinery, to name a few examples. An instrumentation system typically includes transducers and other detecting means for providing "field" electrical signals representing a process, physical phenomena, equipment being monitored or measured, etc. Exemplary transducers include thermocouples, strain gauges, pressure sensors, microphones and cameras. As one example, detectors and/or sensors are used to sense the on/off state of power circuits, proximity switches, pushbutton switches, thermostats, relays or even the presence of positive or negative digital logic-level signals. The instrumentation system typically also includes interface hardware for receiving the measured field signals and providing them to a processing system, such as a personal computer. The processing system typically performs data analysis and presentation for appropriately analyzing and displaying the measured data.

Often, the field signals may comprise high common-mode voltages, ground loops, or voltage spikes that often occur in industrial or research environments which could damage the computer system. In that case, the instrumentation system typically includes signal conditioning circuitry, such as isolation circuitry, e.g., opto-couplers, for eliminating ground-loop problems and isolating the computer from potentially damaging voltages. Signal conditioning modules are typically provided for conditioning the raw field voltage signals by amplifying, isolating, filtering or otherwise converting the signals to appropriate signals for the computer system. In one embodiment, the analog signals are then provided to a plug-in data acquisition (DAQ) input/output (I/O) board, which is plugged into one of the I/O slots of a computer system. The DAQ board may include analog-to-digital (A/D) converters for converting the analog signals to corresponding digital signals. The computer system may have an I/O bus and connectors or slots for receiving I/O boards. Of course, other types of computer systems and I/O buses may be used to implement a processing system.

In general, measurement and control cards or devices have a particular set of resources on-board for use in measurement or control tasks, such as counters, analog to digital converters (ADC), I/O ports, filters, etc. This is especially true with respect to mass produced cards or devices, such as National Instruments MIO (Multifunction Input/Output) DAQ (Data Acquisition) series. These devices typically include a set of resources which meets the needs of a large majority of users. For example, a typical card may include a 16-channel multiplexed AI (analog input) in front of an A/D (analog to digital) converter, 2 analog outputs (AO), 8 digital lines, 10 timing/triggering lines, 2 general purpose counters, plus one or more timing/triggering engines.

Some measurement devices, which may be referred to as reconfigurable I/O (RIO) devices, RIO units, or RIOs, include at least one programmable hardware element which is configurable to perform a measurement and/or control function. This allows the user to re-program the RIO device to perform different functions and allows the user more flexibility in creating customer-defined measurement solutions.

SUMMARY

Various embodiments of a system and method for performing a measurement application are described herein. The system may include a host computer having a processor. The host computer may be coupled to a measurement device having a programmable hardware element. The measurement device may be configured to acquire measurement data from a physical system.

The host computer may be configured to perform a plurality of iterations of a first loop. Each respective iteration of the first loop may include an I/O phase and a control phase. During the I/O phase the processor may read measurement data from the programmable hardware element of the measurement device. During the control phase the processor may use measurement data read from the programmable hardware element to perform an algorithm, e.g., a measurement and control algorithm.

The programmable hardware element of the measurement device may be configured to perform a plurality of iterations of a second loop. Each respective iteration of the second loop may include an active phase and a delay phase. During the active phase the programmable hardware element may store measurement data acquired from the physical system in memory of the programmable hardware element. During the delay phase the programmable hardware element does not store measurement data in the memory.

The host computer may be further configured to execute program instructions to synchronize the second loop performed by the programmable hardware element with the first loop performed by the host computer by communicating with the programmable hardware element to adjust a length of the delay phase for one or more iterations of the second loop.

For example, the host computer may synchronize a particular iteration of the second loop with a particular iteration of the first loop by adjusting a length of the delay phase for the particular iteration of the second loop. The host computer may determine an expected number of clock ticks of a clock of the programmable hardware element expected to have elapsed between a first time when the delay phase of the particular iteration of the second loop began and a second time when the I/O phase of the particular iteration of the first loop began. The host computer may also determine an actual number of clock ticks of the clock of the programmable hardware element that have elapsed between the first time when the delay phase of the particular iteration of the second loop began and the second time when the I/O phase of the particular iteration of the first loop began. The host computer may calculate a difference between the actual number of clock ticks and the expected number of clock ticks, and use the calculated difference to adjust the length of the delay phase of the particular iteration of the second loop. For example, the programmable hardware element may include a timer controlling the length of the delay phase of the particular iteration of the second loop, and the host computer may add the calculated difference to a number of clock ticks with which the timer is configured.

In further embodiments the host computer may further adjust the length of the delay phase for the particular iteration of the second loop in order to compensate for jitter of the processor of the host computer. For each respective iteration of two or more iterations of the first loop performed prior to the particular iteration of the first loop, the host computer may calculate a respective amount of jitter of the processor by calculating an amount of time by which an actual start time of the respective iteration of the first loop differs from an expected start time of the respective iteration of the first loop. The host computer may also calculate a particular amount of jitter of the processor for the particular iteration of the first loop by calculating an amount of time by which an actual start time of the particular iteration of the first loop differs from an expected start time of the particular iteration of the first loop. The host computer may calculate a jitter correction factor as a sum of the respective amounts of jitter for the two or more iterations of the first loop, and may add the particular amount of jitter for the particular iteration of the first loop to the jitter correction factor. The host computer may then use the jitter correction factor together with the calculated difference to adjust the length of the delay phase of the particular iteration of the second loop.

BRIEF DESCRIPTION OF THE DRAWINGS

A better understanding of the invention can be obtained when the following detailed description is considered in conjunction with the following drawings, in which:

FIGS. 5A and 5B illustrate embodiments where a RIO device is in the form of a RIO cartridge chassis or carrier, and one or more measurement cartridges (modules);

Figure 1:
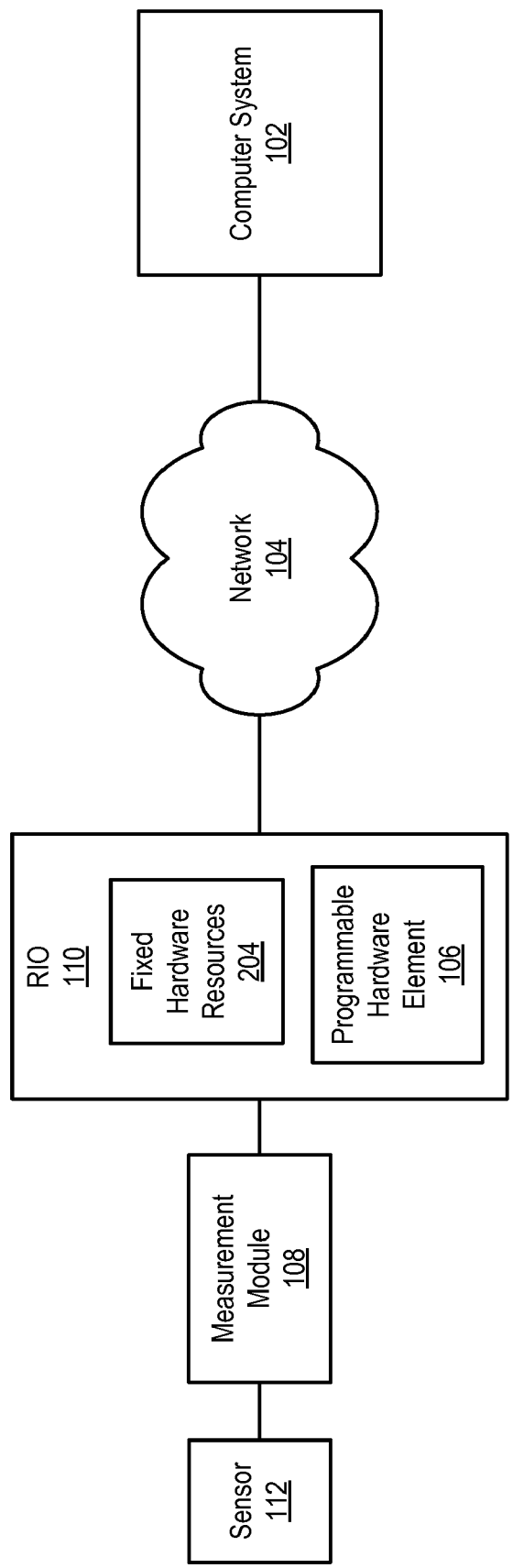
FIG. 1 is a block diagram of a RIO measurement system, according to one embodiment.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Fixed hardware resources—includes hardware resources that have pre-defined functionality. Fixed hardware resources may have some programmable parameters. Examples of fixed hardware include physical I/O resources such as analog to digital converters (ADCs), digital to analog converters (DACs), and digital lines, among others. For example, in the case of a analog input comprising an ADC and a programmable gain stage, the gain parameter of the gain stage may be adjustable or configurable programmatically by the FPGA.

Data processing or data analysis—These terms are used to refer to the processing of data to extract useful information from the data (such as an image) or determine characteristics of the data (or to determine characteristics of one or more objects represented by the data). The term "data processing function" may also include an operation or decision that is performed in response to the information extracted or characteristics determined from the data, i.e., a control function. The term "data processing function" is also intended to include a data processing (or control) algorithm that combines a sequence of two or more data processing functions or tools and/or decision operations that process a data in a desired way or which implement a data processing, control, or machine vision application, such as part inspection, automated assembly, data analysis, pattern matching, edge detection, alarm, logging, etc.

Measurement function—may include measurement and/or control functions, such as acquiring data, conditioning data, logging data, displaying data, analyzing and/or processing received data to generate a result, performing signal processing on received data, or otherwise analyzing and/or processing received data to perform a measurement. More specifically, a measurement function may include one or more of signal acquisition, signal conditioning, signal conversion, and measurement analysis. Examples of measurement functions include various instrumentation functions or control functions, including machine vision, image processing and motion control, among others.

Machine vision function or Image processing function—includes tools such as edge detection, blob analysis, pattern matching, filtering, pixel transformations, and other image processing functions. The term "image processing" is used herein to refer to both "image processing" and "machine vision", to the extent these terms have different meanings.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Various embodiments of a system and method for synchronizing a measurement device with a CPU on a host computer to which the measurement device is coupled are described herein. The measurement device and the host computer may operate together to perform a measurement function. The measurement device may include one or more programmable hardware elements. In some embodiments the one or more programmable hardware elements may include one or more FPGA devices. In some embodiments the measurement device may comprise a RIO device such as described herein.

RIO Overview

The Reconfigurable Input/Output (RIO) architecture may be considered a template or pattern/platform for a reconfigurable measurement (including data acquisition), control (including automation) and/or simulation system, in which software and hardware components, as well as configuration and runtime behaviors, are defined. As used herein, the term "reconfigurable I/O" or "RIO" refers to a device, (e.g., a card) which includes at least one programmable hardware element. In simple terms, a RIO card or unit contains at least one programmable hardware element, i.e., a reconfigurable core, such as a field programmable gate array (FPGA), which may be surrounded by fixed hardware resources (e.g., I/O resources) (both on-board and off-board, e.g. measurement modules). The behavior of the reconfigurable core can be configured to better match the requirements of the measurement and/or control system. In an exemplary embodiment, the system may be implemented as an FPGA that is targeted by a development system, such as National Instruments LabVIEW or LabVIEW FPGA. Other embodiments are also contemplated, e.g., an embodiment which includes an addition of a microprocessor to the FPGA core.

Thus, the reconfigurable core (programmable hardware element) is the basis for RIO. This scaleable resource may include such functions as I/O interfacing, timing and triggering, inline processing, and embedded decision-making. Fixed hardware resources may be connected at the boundary of the reconfigurable core, and may typically provide one of four types of functionality:

1) a control and data path to a host computer;
2) an I/O interface to external systems;
3) optimized hardware elements; and
4) basic operating services.

These resources by themselves may not define the measurement and/or control system, but rather are the low-level building blocks for the creation of the system. The configuration or program (the hardware configuration program) in the reconfigurable core (e.g., the FPGA) builds on these blocks to define the system.

The interface at the boundary of the reconfigurable core provides RIO with a very flexible mechanism for connecting to the fixed resources. The fundamental interface at this boundary may comprise digital and/or analog pins, and the ability of RIO to organize and build on these pins in a hierarchical method is an important capability. RIO allows pins to be grouped into ports that perform specific interfacing functionality. For example, 4 digital pins may be associated with a fixed serial ADC, and together may be considered an interface port. A simpler example is a single digital pin defined as a 1-bit DIO port. The grouping at this level defines the most basic interface to each of the fixed resources.

These low-level ports can be further grouped to provide more advanced functionality. This functionality may include the creation of higher capability interfacing logic, such as counters built on top of several individual DIO ports, or the addition of logic to an interface, such as a digital filter placed inline with an ADC interface. This hierarchy of groups is not limited to one level, and may be arbitrarily deep.

It is important to note that RIO is not limited to digital only solutions. Other embodiments include reconfigurable digital and analog circuitry. The grouping and connecting of "logic" in the FPGA may also include reconfigurable analog building blocks that can be configured to perform user defined analog functionality, such as, for example, an uncommon ADC with 11 bits of resolution with an integrated analog low pass filter.

The concept of grouping pins also applies to communication mechanisms for RIO, such as for communicating with a host computer. The low-level grouping defines a physical interface which may connect to buses or interface chips implementing PCI, USB, IEEE-1394, Ethernet, etc. The creation of read and write registers on top of the physical interface may implement the actual communication. The use of these registers is application dependent, but their method of access may be generic.

Control and data paths (1) and the I/O interface (2) above are very similar in concept, but specific to the type of interface they are implementing and communicating with. As described in 3) above, communication paths may take advantage of optimized hardware elements. For example, to communicate with the host a hardwired PCI interface (e.g., National Instruments minMITE) may be utilized. If extraordinary FFT performance is desired or required, application specific integrated circuits (ASICs), specialized DSPs, or other FPGAs implementing Fast Fourier Transforms (FFT) may be used.

The operating services of 4) above may refer to external (or internal) blocks that provide basic services to the reconfigurable core, e.g., a basic clock reference (internal and external (system)), a reconfiguration path (from host or persistent store), and a persistent store. It can also include basic standard debugging interfaces, and connectivity to RAM, among other services.

In addition to the creation of user specific I/O interfaces, RIO may provide for the timing and triggering of these interfaces, allowing for very flexible relationships between resources. For example, the user may configure one group of I/O to be sampled at one rate, and another group at a completely independent rate. This same flexibility may apply to starting, stopping, pausing, etc. of I/O operations.

Another possible use of the reconfigurable core is to provide processing. The inclusion of decision making capabilities in the hardware may be useful at all levels of the measurement and/or control system. For example, decision logic on the programmable hardware element may be used to transform signals, such as converting quadrature signals into count and up/down controls for a counter, for inline processing, such as adding linearization to an analog input data stream, for creating complicated trigger sequences, such as state based triggering for bus analyzers, and for high-speed control loops, such as PID. This decision-making capability may provide wide flexibility to many applications, and in some cases may allow the application to run autonomously in the FPGA without any host computer interaction.

Yet another possible use of the programmable hardware element is to implement any of a variety of interfaces for communicating with a measurement module. In other words, the RIO device may be operable to be programmed with an interface protocol which is specific to a given measurement module. In addition, this programming may occur dynamically and/or automatically, such as upon connection to the module. These and other embodiments are described in detail below.

A RIO device as described herein may be capable of being configured or programmed (in hardware) to perform any of a variety of measurement, control, and/or simulation tasks, i.e., to assume the properties in hardware of various devices or configurations of devices, as well as measurement and/or control functions. A RIO device may be used to perform any of various types of hardware operations in any of various applications.

Exemplary applications targeted by RIO include, but are not limited to, measurement and data acquisition, embedded I/O and machine control, high-speed analog control loops, high density discrete control, hardware in the loop simulation, and applications requiring custom hardware triggering and/or digital logic, among others. In general, RIO may be particularly suitable for developing simple hardware functionality which is difficult to express in fixed hardware resources, including complex triggering, quadrature encoding, simple bit transfers, and the like, as well as hardware based interlocks, simple control algorithms, e.g., PID (proportional integral derivative), and simple measurements, DSP, rise time, fall time, RMS (root mean square), FIR (finite impulse response) filters, and period measurement, among others, although it is noted that RIO may be used for any other hardware development as well.

FIG. 1—Block Diagram of a RIO Measurement System

FIG. 1 is a block diagram of a RIO measurement system, according to one embodiment. As FIG. 1 shows, sensor 112 may optionally be coupled to a measurement module 108, described above, which may in turn be coupled to a RIO unit or RIO device, also referred to as a RIO 110. Alternatively, the sensor 112 may couple directly to the RIO device 110, and measurement module 108 may not be included.

In the example of FIG. 1, the RIO 110 is coupled to a computer system 102 via a network 104. In various embodiments the network 104 may include any type of network or combination of networks, such as one or more local area networks (LAN), wide area networks (WAN), wireless networks, an Intranet, the Internet, etc. Examples of local area networks include Ethernet networks, Fiber Distributed Data Interface (FDDI) networks, and token ring networks. Also, the RIO 110 and the computer system 102 may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

In other embodiments the RIO 110 may be coupled to the computer system 102 in any of various other ways, e.g., using any of various transmission media or communication techniques which allow the RIO 110 and the computer system 102 to communicate. In some embodiments the RIO 110 may be directly attached to the computer system 102, e.g., through a communication slot, one or more communication buses, one or more cables, etc. In some embodiments the RIO 110 may be coupled to the computer system 102 through one or more intermediate devices. In other embodiments the RIO 110 may be coupled to the computer system 102 wirelessly.

In an embodiment where the sensor 112 couples directly to the RIO device 110 (i.e., where there is no measurement module), the RIO device 110 may be operable to perform any necessary signal conditioning and/or signal conversion on the signals sent by the sensor 112. Alternatively, signal conditioning and/or signal conversion may not be necessary. The RIO device 110 may then perform analysis or other data processing on the signals, and send results of the analysis to the computer system 102 or another device. The RIO device 110 may also perform analysis and generate real time control signals to a process or system being controlled.

The measurement module 108 and the RIO unit (carrier) 110 together may provide the functionality of the RIO measurement device 110 of FIG. 1. For example, in one embodiment, the measurement module 108 may be operable to perform signal conditioning and/or signal conversion on the signals sent by the sensor 112, and to transmit results of such processing on to the RIO 110. In this embodiment, the measurement module 108 may include one or more fixed hardware resources used by the programmable hardware element on the RIO 110. In one embodiment, the RIO 110 may be operable to receive data from the measurement module 108, perform a function on the data, and communicate the data (possibly in a different format or form) to the computer system 102, e.g., over the network or transmission medium 104. For example, the RIO 110 may receive signal data in a proprietary format from the measurement module 108 and format the data for transmission over wireless Ethernet to the computer system 102.

The host computer 102 may comprise a CPU, a display screen, memory, and one or more input devices such as a mouse or keyboard as shown. The computer 102 may be used to configure or program the RIO measurement device 110, as described below. Additionally, the computer 102 may operate with the measurement device 110 to analyze or measure data from the sensor 112 and/or measurement device 110 or to control the sensor 112 and/or measurement device 110.

In one embodiment, the computer system 102 may store an application development environment (ADE) for creating programs. The ADE may include specific functionality for creating programs that are to be deployed on a RIO device 110. The ADE may also include specific functionality for a certain type of application, such as measurement, control, or automation, among others.

The computer system may also store a program implementing a function. For example, the computer system may store a program implementing one or more measurement functions, i.e., a measurement program, e.g., a program, such as a graphical program, implementing the one or more measurement functions.

The computer system 102 may be operable to execute the measurement program to perform the one or more measurement functions, preferably in conjunction with operation of the RIO 110 and/or measurement module 108. For example, the measurement program may be executable to perform one or more measurement and/or control functions, including analysis of data or signals received from the RIO 110, control of RIO and/or measurement module operations, user interface functions, and pattern recognition and/or characterization, among others.

The computer system 102 may store a deployment program which is executable to generate a hardware configuration program based on a program generated by the ADE. The deployment program may be part of the ADE. The deployment program may also be executable to transfer or deploy the hardware configuration program onto a programmable hardware element (or multiple programmable hardware elements) of a RIO device 110.

In the preferred embodiment, the RIO 110 includes at least one programmable hardware element 106, which may be programmed by computer system 102. In one embodiment, the RIO 110 may include a plurality of programmable hardware elements 106. The computer system 102 may also couple to multiple RIO units 110, wherein each RIO unit 110 includes one or more programmable hardware elements 106. For example, the computer system 102 may couple to multiple RIO units 110, wherein the RIO units 110 may be distributed in various locations on a network (such as the Internet).

Where the RIO unit 110 includes a plurality of programmable hardware elements 106, the computer system 102 may be operable to transfer or deploy a hardware configuration program onto one or more (or all) of the plurality of programmable hardware elements of the RIO device 110. Thus the hardware configuration program may be generated and/or deployed in a manner to distribute the hardware configuration program across multiple programmable hardware elements 106. The hardware configuration program may also be generated and/or deployed in a manner to distribute the hardware configuration program across multiple RIO devices 110, wherein each RIO device may include one or more programmable hardware elements 106.

In one embodiment, the RIO device 110 may include one or more fixed hardware resources 204. Fixed hardware resources 204 may also be located external to the RIO device 110, such as the measurement module 108, or on the sensor 112. A deployed hardware configuration program on the RIO device 110 may be operable to invoke functionality of one or more of the hardware resources 204. A user may specify use of fixed hardware resources 204 when creating the program using the ADE. Alternatively, or in addition, the deployment program may automatically specify use of fixed hardware resources.

Thus, the RIO unit(s) 110 may be reconfigurable, i.e., programmable by an external computer system, such as computer system 102. More specifically, the computer system may be operable to deploy the measurement program onto the programmable hardware element(s) of the RIO unit(s) 110. In other words the computer system 102 may download the measurement program onto the programmable hardware element of the RIO 110, after which the RIO 110 may be operable to execute the measurement program to perform the one or more measurement and/or control functions.

After a measurement program has been deployed as a hardware configuration program onto the programmable hardware element of the RIO 110, the RIO may operate in a stand-alone fashion to perform the measurement function. For example, the RIO unit may be disconnected from the computer system 102 or from the network to which it is attached, and the RIO 110 may be used to perform the measurement function as a stand-alone device. Alternatively, the RIO device 110 may optionally operate in conjunction with operation of the measurement module 108, and possibly the computer system 102, as well as other devices, such as other RIOs 110, smart sensors, networked devices, etc. The configured RIO 110 and the measurement module 108 may thus be operable to perform measurement (i.e., data acquisition and/or control) operations using the sensor 112 and/or the computer system 102. More generally, a measurement function may be distributed across multiple devices, such as one or more RIO units 110, one or more sensors (such as smart sensors), one or more measurement modules, one or more computer systems, and/or one or more instruments or other devices.

In one embodiment, the RIO unit 110 may be operable to receive interface protocol information from the measurement module 108 specifying how to operate or interface with the measurement module 108. The RIO unit 110 may then communicate the interface protocol information to the computer system 102. Alternatively, the measurement module 108 may communicate the interface protocol information directly to the computer system 102. Based on the interface protocol information, the computer system 102 may program or configure the programmable hardware element 106 on the RIO unit 110 to implement the interface as specified by the measurement module 108. In other words, the measurement module 108 may tell the RIO 110 how to "talk" with it, and the RIO 110 may then tell the computer system 102 how to program the RIO 110 to communicate with the measurement module 108 accordingly (or the measurement module 108 may tell the computer system 102 directly how to program the RIO 110 (i.e., the RIO's programmable hardware element 106). The computer system 102 may then program the RIO 110 (i.e., the RIO's programmable hardware element 106), thereby implementing the interface specified in the interface protocol information communicated by the measurement module 108. This process may be referred to as initialization of the measurement module/RIO. Further details of this process are described below.

In one embodiment, the RIO device 110 may include an IP address and web server capabilities. Thus the RIO device 110 may be able to publish received signals or measurement data over the Internet. The RIO device 110 may similarly be operable to receive signal data over the Internet for processing. In another embodiment, one or more measurement cartridges 108 and/or sensors 112 coupled to the RIO device 110 may have an IP address and web server capabilities, and thus may be able to communicate with remote systems over the Internet, for example, to stream sensor data (e.g., numerical data or images) to a website for access by other systems or users.

The computer 102 may include a memory medium on which computer programs may be stored. The memory medium may be comprised in the computer 102 where the programs are executed or may be located on a second computer which is coupled to the computer 102 through a network, such as a local area network (LAN), a wide area network (WAN), or the Internet. In this instance, the second computer operates to provide the program instructions through the network to the computer 102 for execution. Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

Thus, programs may be stored in a memory medium of the respective computer 102, or in a memory medium of another computer, and executed by the CPU. The CPU executing code and data from the memory medium thus comprises a means for deploying a graphical program onto a RIO device 110.

The memory medium may store an ADE for creating programs having a desired functionality, wherein these programs are convertible to a hardware configuration program that can be deployed to a RIO device 110. Deployment may be performed by converting at least a portion of a program into a form for configuring or programming a programmable hardware element. In alternate embodiments, deployment may be performed by transferring the program to execute natively on a processor, or by converting the program to a different form and transferring the converted program for execution by a processor and memory. The RIO device 110 in FIG. 1 may be controlled by or configured by programs which are deployed or downloaded to the programmable hardware element on the RIO device 110. In various embodiments, the program deployed on the RIO device 110 may be any of various types, such as programs created in graphical languages, text-based programming languages, or hardware description languages, etc.

With respect to the ADE for creating the program to be deployed onto the RIO device 110, input to the ADE may be textual, graphical, a hardware description language, may be through a configuration environment (e.g., a wizard) or an API structural description.

In one embodiment, the memory medium may store a graphical programming development system for developing graphical programs. The memory medium may also store one or more deployment computer programs which are executable to deploy a program such as a graphical program.

As described below, in one embodiment the graphical program may be deployed by either one or more of: 1) converting the graphical program (or a portion thereof) into a hardware implementation (hardware configuration program) and configuring the programmable hardware element with this hardware implementation, 2) transferring a first portion of the graphical program (or a portion thereof) to a memory for execution by a processor (where the memory and processor are on the RIO device 110 or the computer system 102), wherein the processor may execute a graphical program execution engine and optionally a real time operating system), and deploying a second portion of the graphical program as a hardware configuration program on a programmable hardware element (e.g., a RIO device with mixed LabVIEW RT (Real Time) and LabVIEW FPGA execution); or 3) compiling a first portion of the graphical program (or a portion thereof) into an executable program and transferring the executable program to a memory for execution by a processor (where the memory and processor are on the RIO device 110 or the computer system 102), (where the processor may optionally execute a real time operating system), and deploying a second portion of the graphical program as a hardware configuration program on a programmable hardware element.

FIGS. 1A-1D—Various Embodiments of a RIO System

FIGS. 1A-1D illustrate various exemplary embodiments of a RIO system 110. The examples presented are meant to be illustrative only, and are not intended to limit the particular form or composition of the system.

Figure 1A:
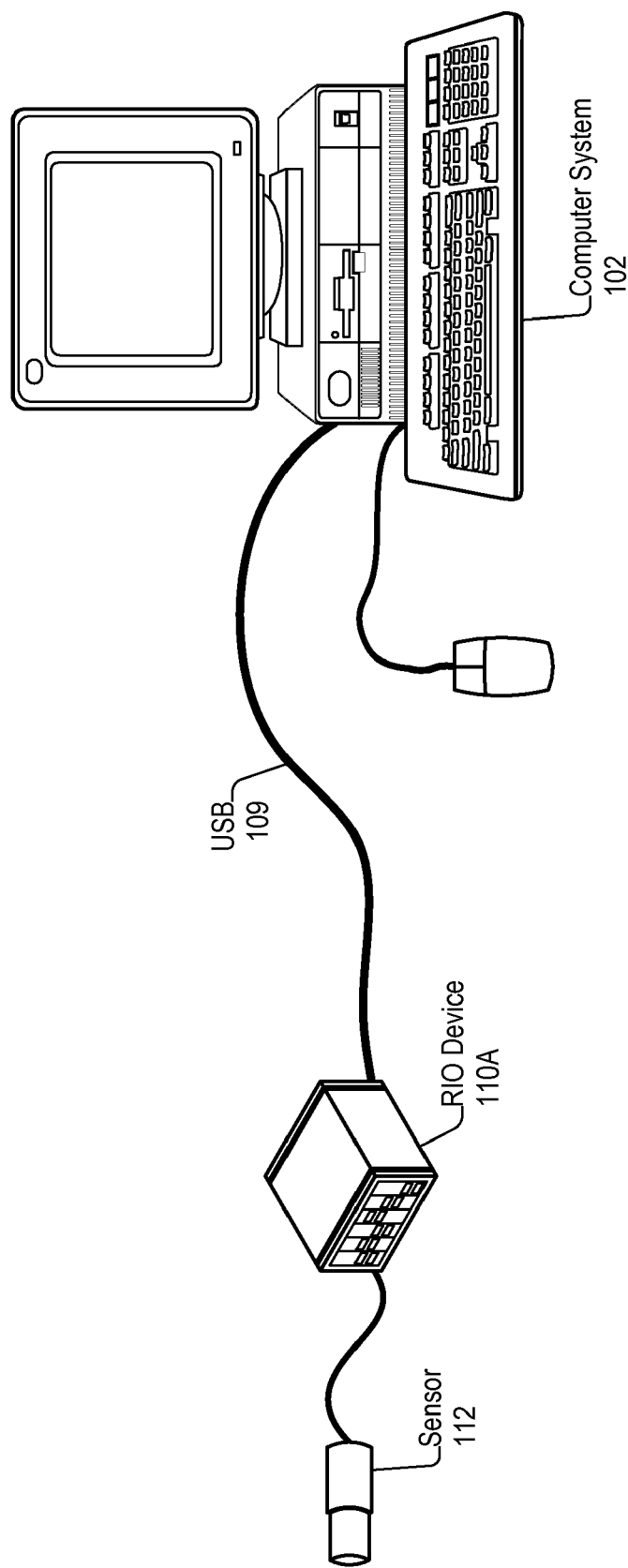
FIGS. 1A-1E illustrate various example embodiments of a RIO system.

FIG. 1A illustrates a computer system 102 coupled to a RIO measurement or control device 10A, according to one embodiment. As FIG. 1A shows, in some embodiments the computer system 102 may couple to the RIO measurement device 110A through a transmission medium, e.g., a serial bus, such as a USB 109. It should be noted that although a USB 109 is shown in this example, any other transmission medium may be used, including Ethernet, wireless media such as IEEE 802.11 (Wireless Ethernet) or Bluetooth, a network, such as a fieldbus, a Control Area Network (CAN) or the Internet, serial or parallel buses, or other transmission means.

As FIG. 1A shows, the RIO measurement device 110A may in turn couple to or comprise a sensor or actuator 112, such as a pressure or temperature gauge, a thermocouple, an imaging device (e.g., a camera), or any other type of sensor or actuator.

Figure 1B:
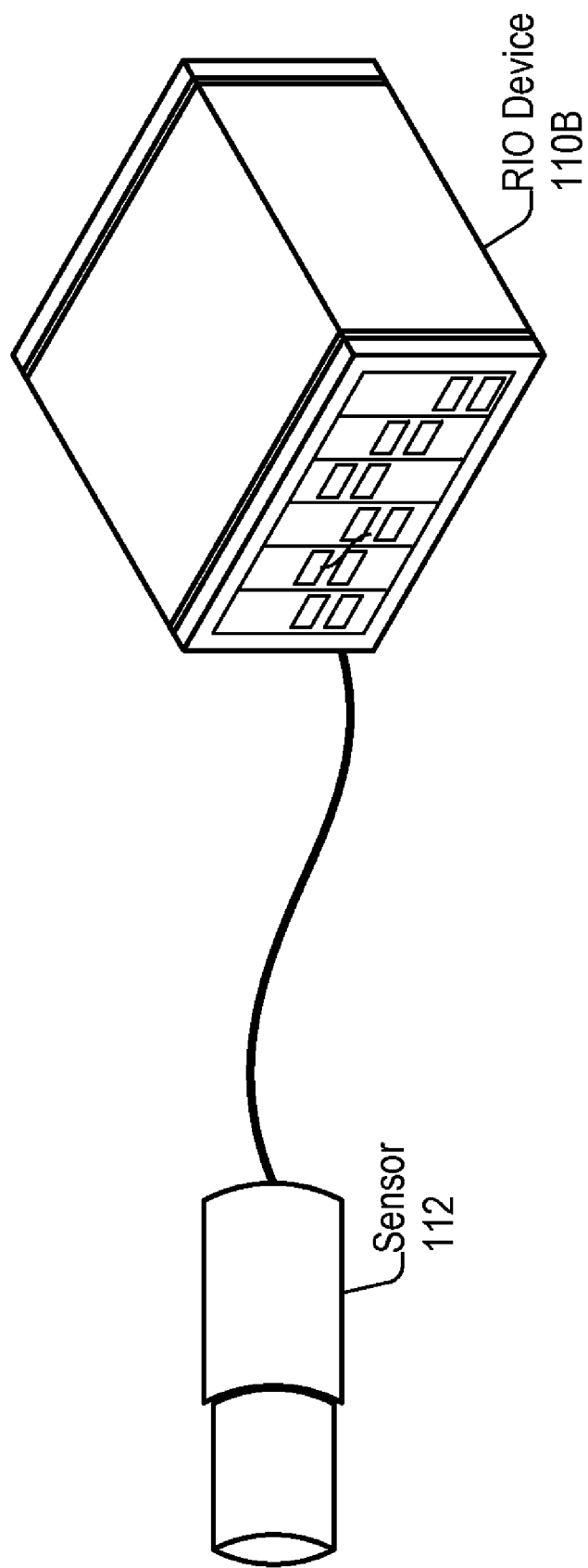

FIG. 1B illustrates a RIO system which comprises a RIO device 110B coupled to sensor 112. As shown in FIG. 1B, this RIO system does not include the computer system 102. Thus, the RIO device 110B may be operable to function independently of the computer system 102 of FIGS. 1 and 1A. As may be seen, the RIO device 110B may comprise a chassis having slots for one or more measurement modules. The measurement modules may be operable to perform one or more measurement, processing or control functions as described below. Each measurement module may perform various measurement and/or control functions, including data acquisition, signal conditioning, ADC, microprocessor, and optional isolation functions for sensor to digital operations. In one embodiment, the RIO device 110B may include a module 108 comprising a computer on a card, i.e., the functions of the computer system 102 may be performed by a module 108 comprised in a slot on the RIO device 110B.

The programmable hardware element 106 and the fixed hardware resources 204 of the RIO device 110 may be comprised in the chassis, or may both be comprised on one or more of the measurement modules 108. In one embodiment, the programmable hardware element 106 may be comprised in the chassis, and the fixed hardware resources 204 may be comprised on one or more measurement modules 108, or the fixed hardware resources 204 may be comprised in the chassis and in various ones of the measurement modules 108.

In one embodiment, the RIO measurement device 110B may include, in addition to the programmable hardware element 106 (e.g., the FPGA) and fixed hardware resources 204, a memory, such as a non-volatile memory or EEPROM, which may store a hardware configuration usable to program the FPGA.

In an embodiment where the RIO 110B implements an interface for communicating with a measurement module 108, an EEPROM 288 may contain an Electronic Data Sheet (EDS), defined by IEEE 1451.2, and an optional calibration history.

IEEE 1451.2 defines an interface between transducers and microprocessors useful in industrial automation and other fields. The standard defines a physical interface comprising a data transport serial link, in addition to triggering, interrupt and hot swap signaling. The standard also defines a transducer electronic data sheet, TEDS, that describes the functionality of the transducer in machine-readable form. The interface supports as many as 255 independent transducer channels. These may be accessed individually or as a unit. The standard may be used to implement a variety of measurement functions.

Figure 1C:
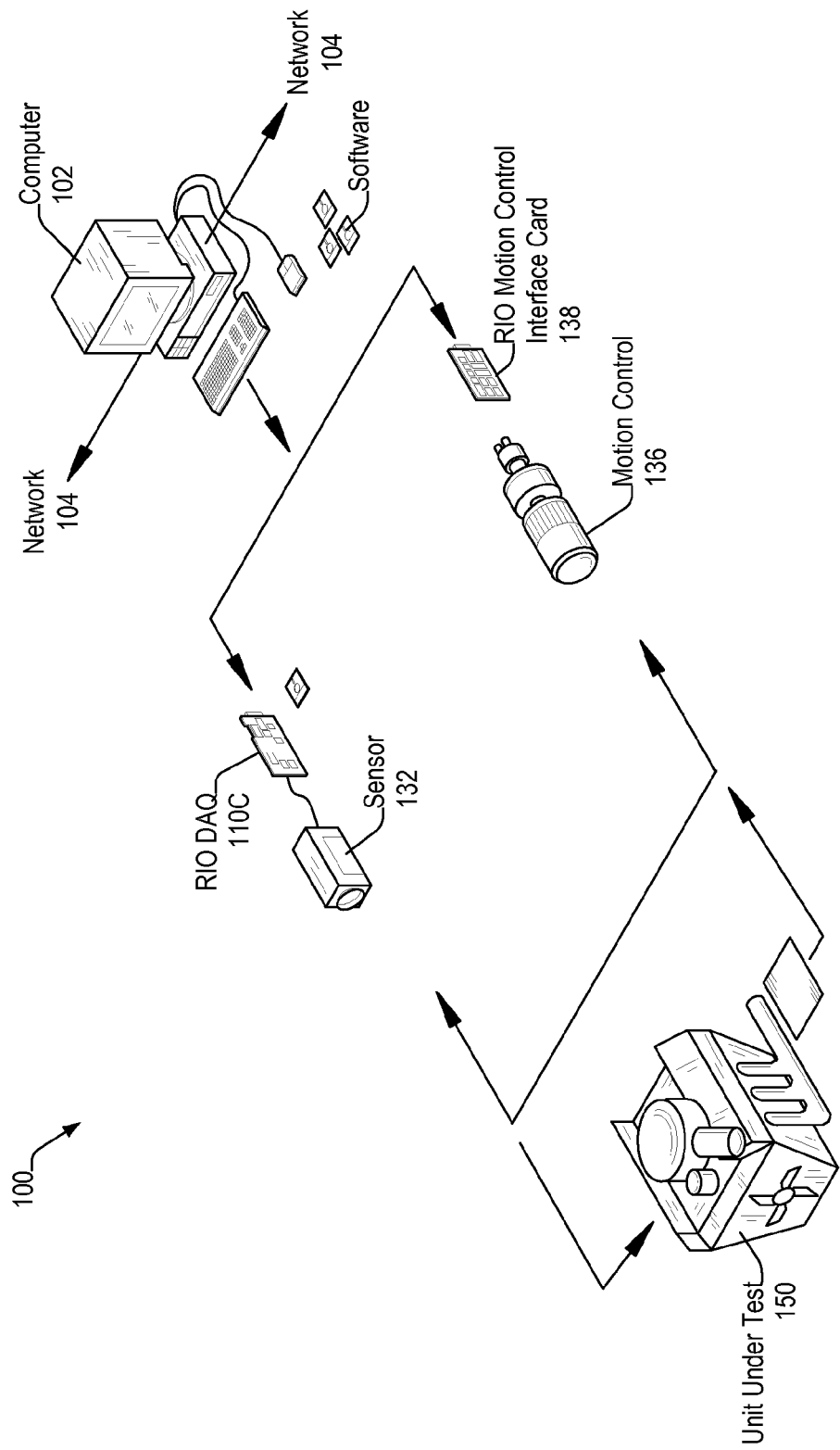

FIG. 1C illustrates a host computer system 102 coupled to a RIO measurement device 110C. FIG. 1C illustrates an exemplary measurement, control, or machine vision system 102. As FIG. 1C shows, the measurement device 110C may be a RIO device. The motion control interface 138 may also be a RIO Device. The measurement device 10C may in turn couple to or comprise a sensor, such as camera 132. The motion control interface 138 may in turn couple to a motion control unit 136.

The measurement device 110C may include a programmable hardware element for performing measurement and/or control functions as described below. The motion control interface 138 may also include a programmable hardware element 106 and one or more fixed hardware resources 204 for performing measurement and/or control functions as described below.

In one embodiment, the device 110C may not be present, and the sensor 132 may be a smart sensor which is or comprises a RIO device (e.g., a smart camera which is or comprises a RIO device 110). In another embodiment, the device 138 may not be present, and the motion control unit 136 may be a smart motion control device which is or comprises a RIO device.

The host computer 102 may comprise a CPU, a display screen, memory, and one or more input devices such as a mouse or keyboard as shown. The computer 102 may operate with the measurement device to analyze, measure or control a device or process 150. Alternatively, the computer 102 may be used only to configure the programmable hardware element in the measurement device 110C.

As shown, a sensor device or camera 132 may be coupled to the computer 102 via the measurement device or card 110C. The camera 132 and/or measurement device 110C may couple to the computer 102 through a serial bus, a network, or through other means. The motion control unit 136 and the RIO motion control interface 138 may also couple to the computer 102 through any means.

The measurement/control system 100 may be used in a manufacturing assembly, test, measurement, and/or control application, among others. For illustration purposes, a unit under test (UUT) 150 is shown which may be positioned by a motion control device 136 (and interface card 138), and imaged and analyzed by the camera 132 and measurement device 110C. It is noted that in various other embodiments the UUT 150 may comprise a process or system to be measured and/or analyzed.

Figure 1D:
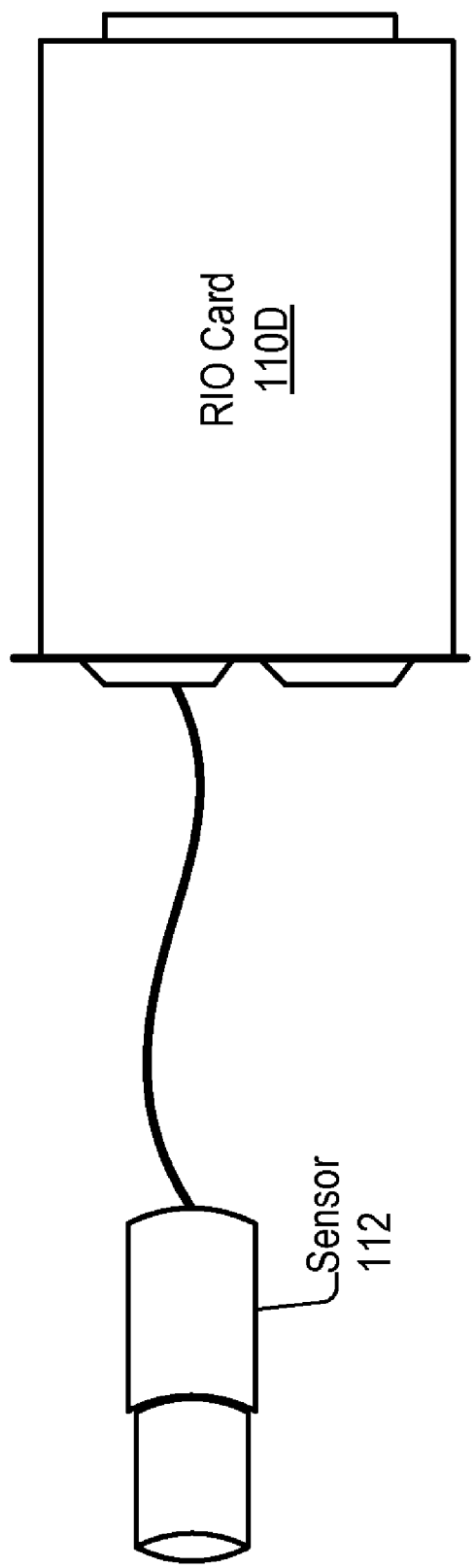

FIG. 1D illustrates an embodiment of a RIO system comprising a RIO card 110D coupled to sensor 112 through the card I/O connections. In this embodiment, the RIO card 110D may be coupled to a computer system for initialization/configuration then decoupled 102 and used independently from the computer system 102. For example, the configured RIO card 110D may be bolted or coupled to another device, e.g., a motion control device, or any other device or system.

Figure 1E:
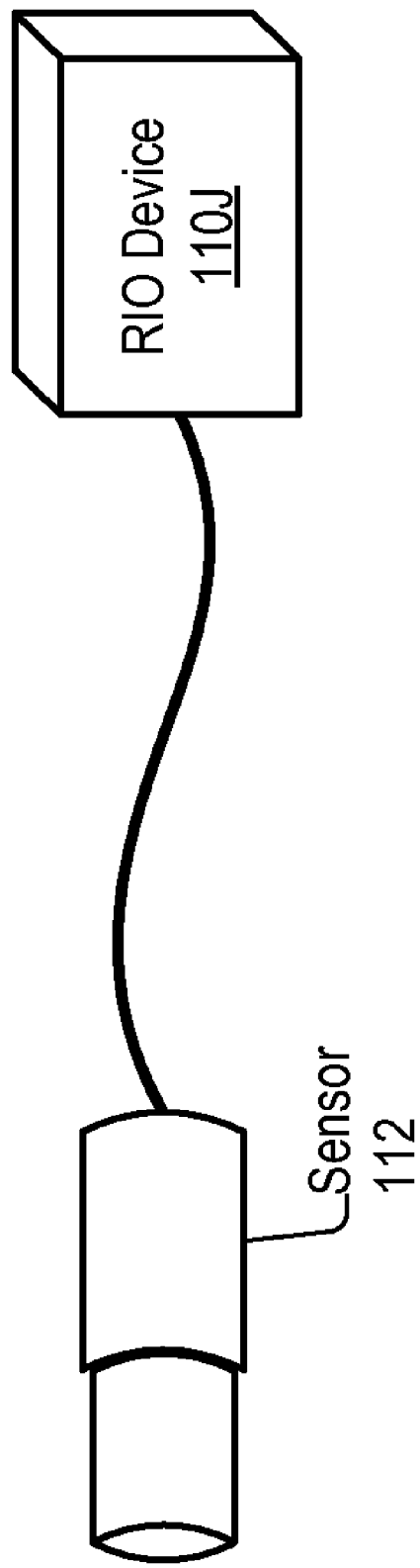

FIG. 1E illustrates an embodiment of a RIO device 110J implemented as a small form factor device which includes a programmable hardware element, one or more fixed hardware resources, an optional processor and memory, and an interface, such as an Ethernet, Internet, USB, FireWire, or other interface. For example, the RIO device 110J may be comprised in a small standalone device (e.g., a device with dimensions less than about 2" by 2" by 1"), a smart camera, a motion control device, wireless and wired telephones, network devices, a cable connector, a pacemaker, an I/O device, a PDA, artificial limbs, musical instruments, home appliances, surveillance devices, satellites, etc.

Thus, the RIO device 110J may assume a variety of forms and functionality, depending upon the particular application requirements. Other embodiments also contemplated are described below.

Figure 2A:
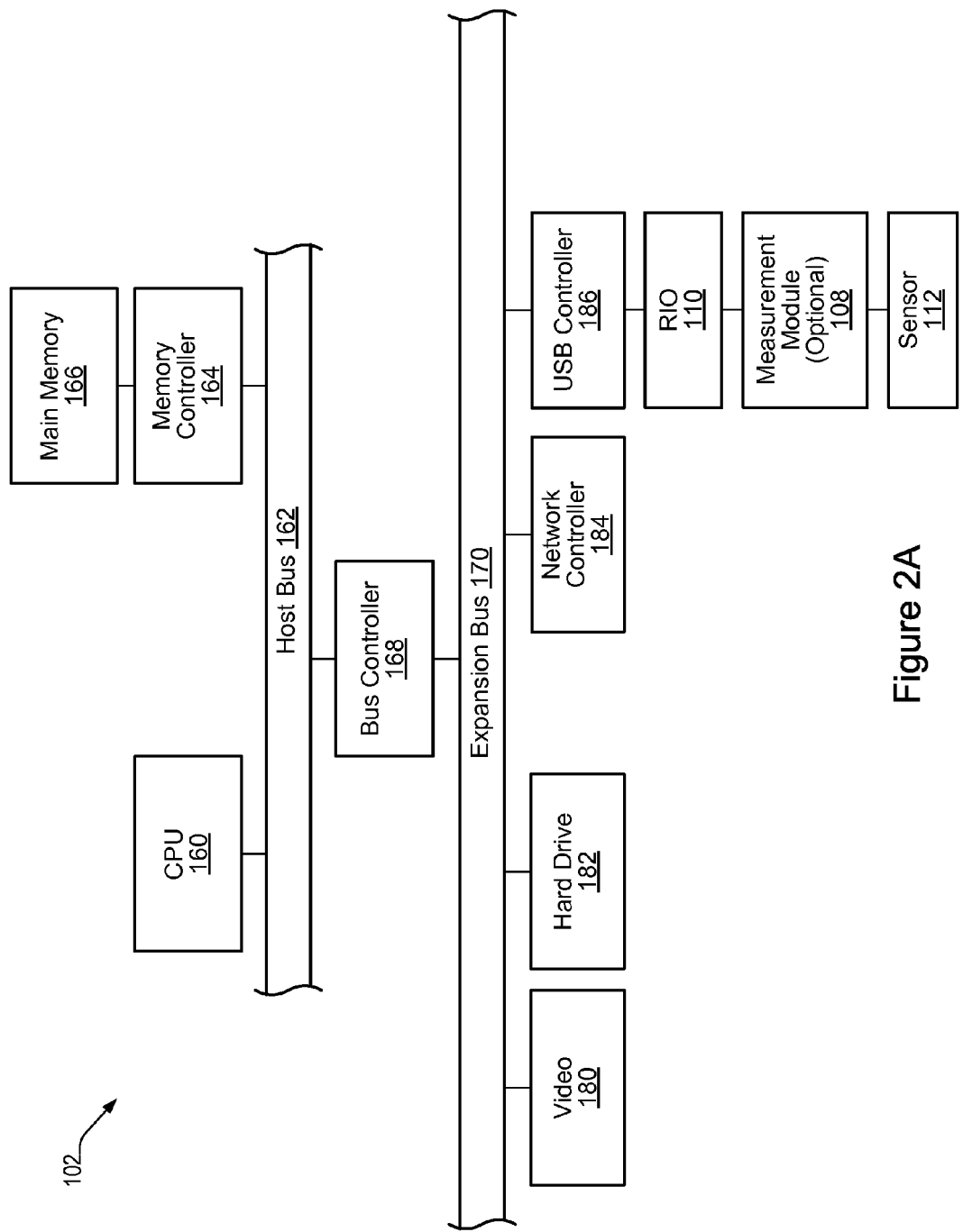
FIGS. 2A and 2B illustrate example embodiments of a host computer.
Figure 2B:
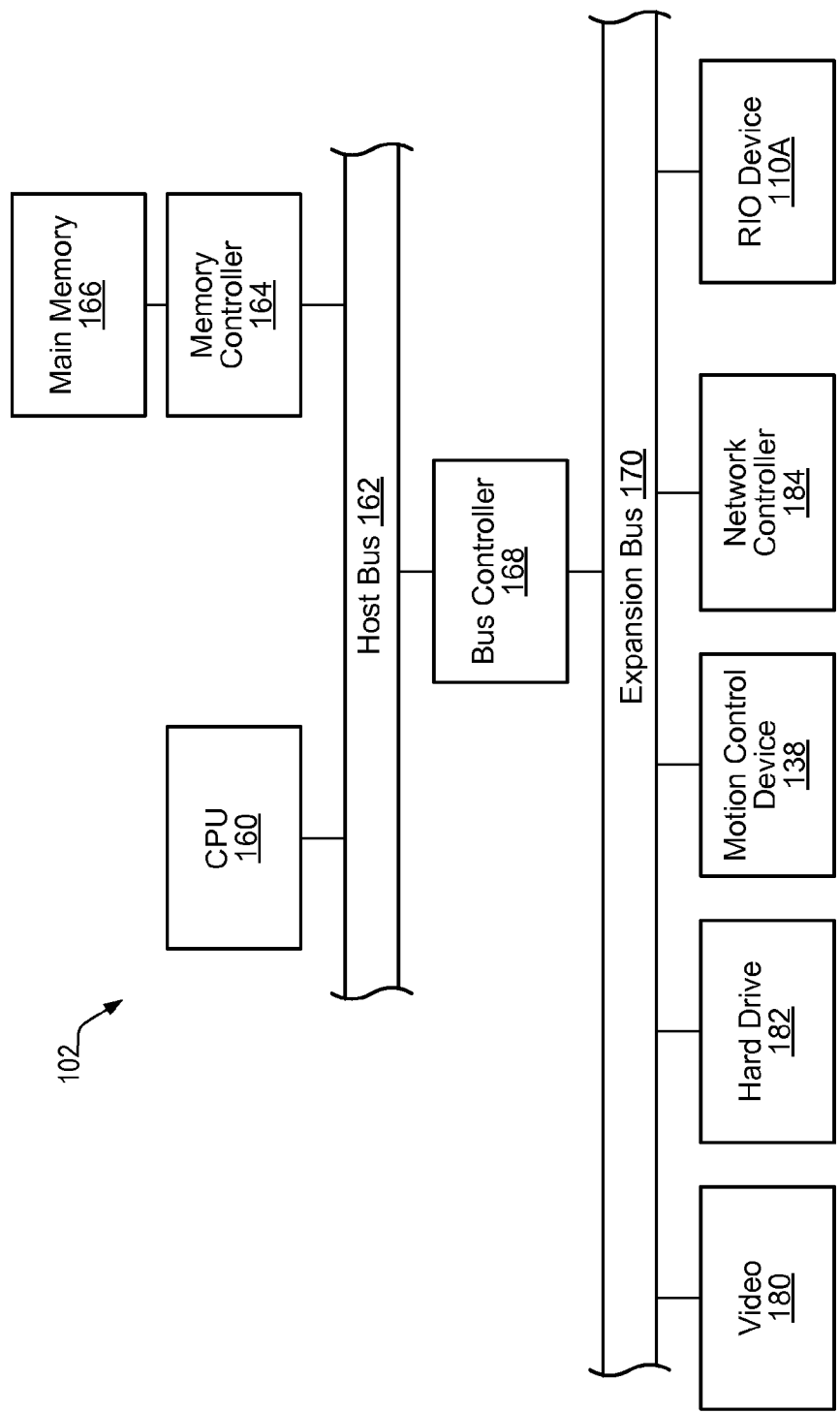

FIGS. 2A and 2B—Computer Block Diagrams

FIGS. 2A and 2B are exemplary block diagrams of the computer 102 of FIGS. 1A-1C. The elements of a computer not necessary to understand the operation of the present invention have been omitted for simplicity. As FIGS. 2A and 2B show, the computer 102 may include at least one central processing unit (CPU) or processor 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 may be operable to store one or more programs. For example, the memory medium 164 may store a program which is executable to use interface protocol information received from the RIO 110 to program or configure the programmable hardware element 106 comprised in the RIO 110. The main memory 166 may also store operating system software, i.e., software for operation of the computer system, as well as one or more application programs, as is well known to those skilled in the art. In addition, the main memory 166 may store one or more measurement programs which are executable to perform measurement (including DAQ) and/or control tasks.

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices.

In FIG. 2A, the devices coupled to the expansion bus 170 include a controller 186, e.g., a USB controller 186, here shown coupled to RIO 110. In this embodiment, the RIO 110 is coupled to an optional measurement module 108, e.g., a National Instruments small form-factor measurement module 108, which in turn is coupled to a sensor 112. In this embodiment, the devices also include network controller 184, video display subsystem 180 and hard drive 182 coupled to the expansion bus 170, also shown. It should be noted that the network controller 184 may be any type of network controller, including Ethernet, wireless Ethernet (IEEE 802.11), Bluetooth, and CAN, among others. Furthermore, the USB controller shown is meant to be illustrative only, i.e., any other type of controller may be used as desired to communicate with the RIO device 110. In other embodiments, the controller 186 may be comprised in the bus controller 168, or may be implemented in any other forms customary and known in the art.

In FIG. 2B, the examples of devices coupled to the expansion bus 170 shown include a RIO device 110A, a network controller 184 (such as for coupling to a device 110 over a network, as described above with reference to FIG. 1C), a motion control device 138, such as shown in FIG. 1B, as well as a hard drive 182, and a video display subsystem 180. The RIO device 110A may be implemented in any of various computer system components, such as network device 184, motion control device 138, bus controller 168, etc.

Figure 3A:
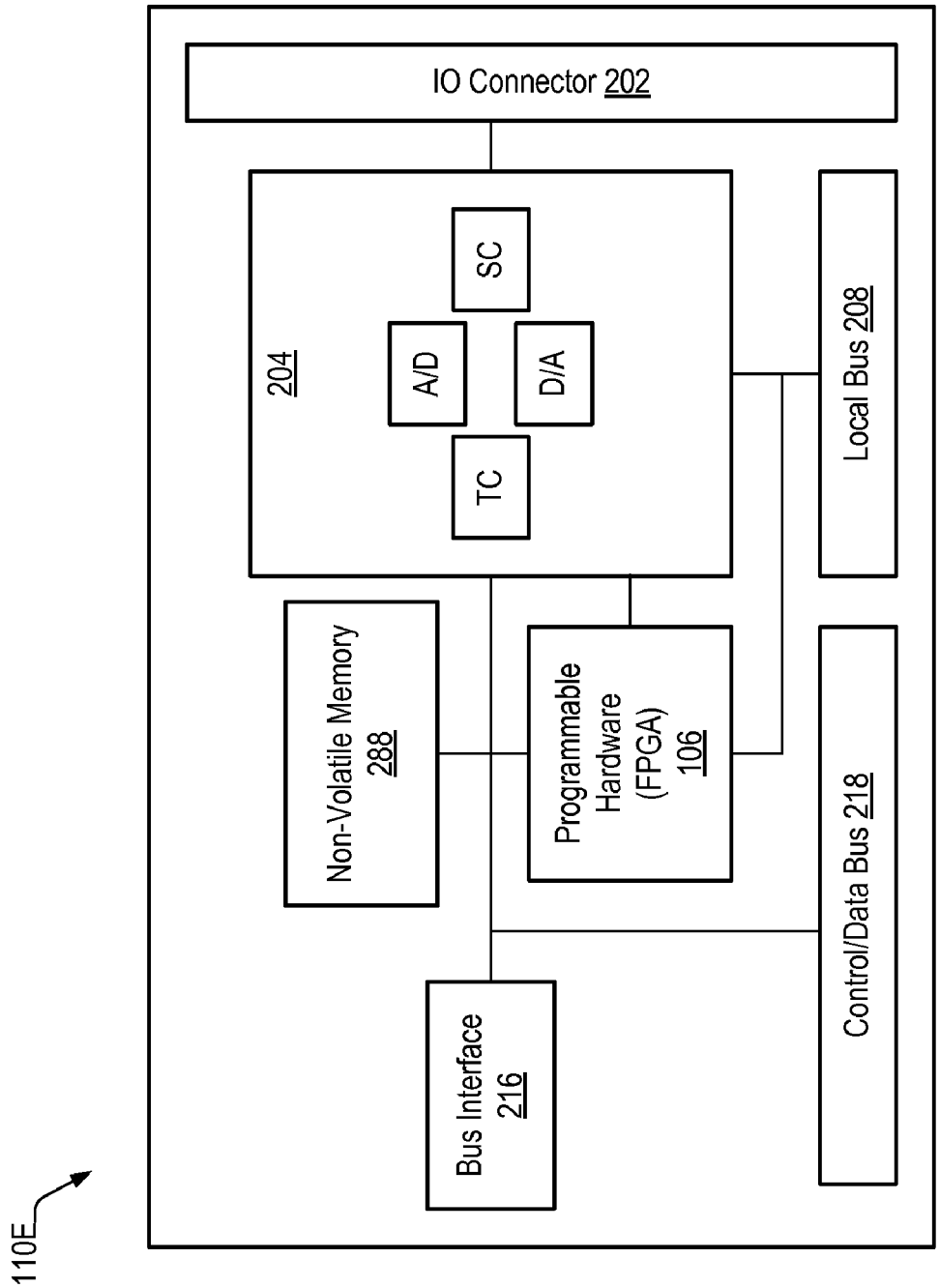
FIGS. 3A and 3B are block diagrams of embodiments of a RIO device including one or more programmable hardware elements, such as an FPGA.
Figure 3B:
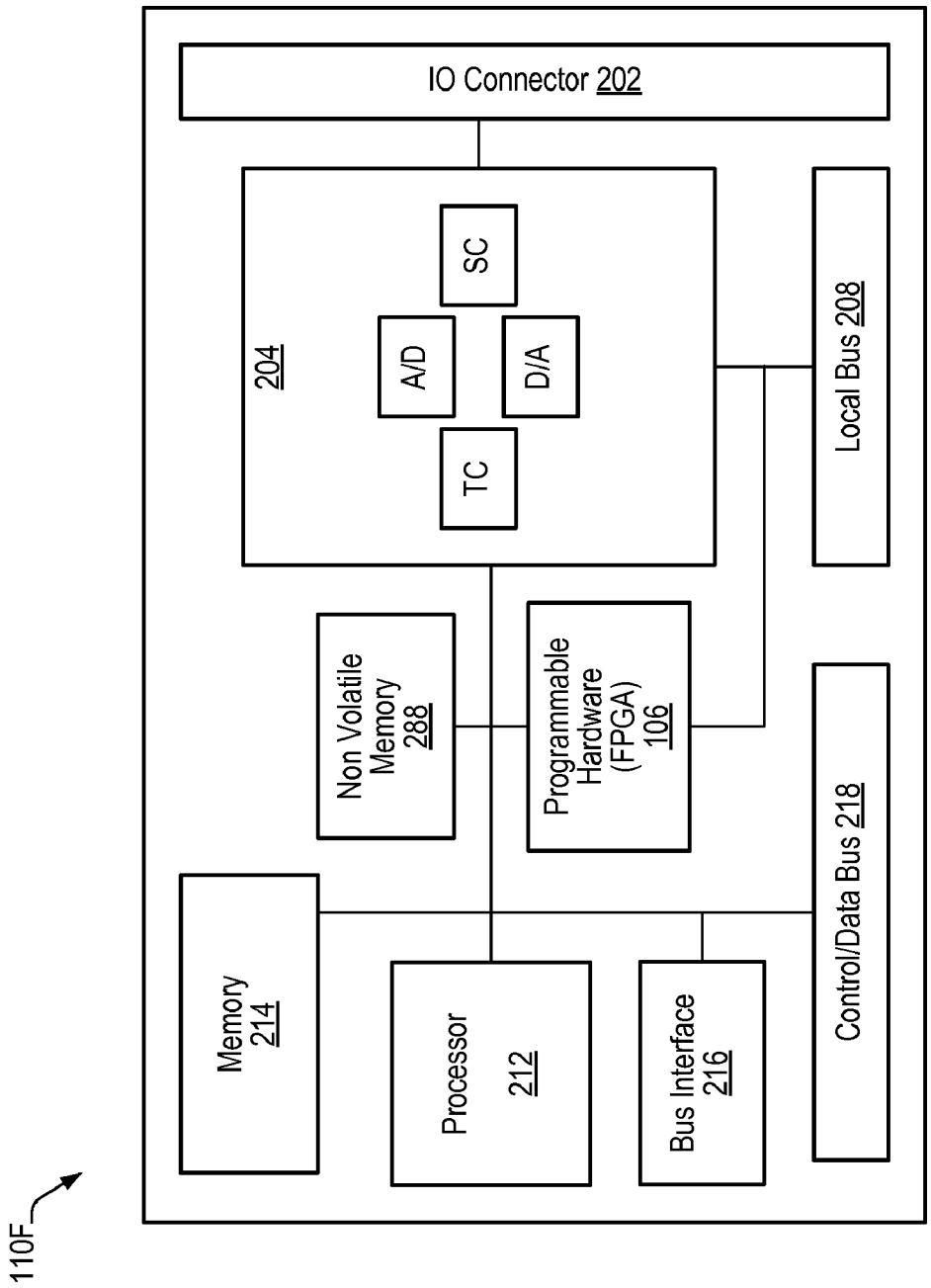

FIGS. 3A and 3B—Reconfigurable I/O Devices

FIGS. 3A and 3B are block diagrams of embodiments of a RIO device including one or more programmable hardware elements 106, such as an FPGA, and example auxiliary components. FIGS. 3A and 3B show exemplary RIO device block diagrams, where the RIO device 110 is shown as a card or board. These embodiments also apply to other RIO device embodiments and form factors.

FIG. 3A—a RIO with Programmable Hardware

FIG. 3A is a block diagram illustrating a RIO device, e.g., a RIO card 110E, configured with programmable hardware according to one embodiment. It is noted that FIG. 3A is exemplary only, and a RIO card or device 10E configured with programmable hardware may have various architectures or forms, as desired. For example, the device may be internal or external to the computer 102, and may be connected to the computer through a network, such as the Internet. The RIO card 110E illustrated in FIG. 3A may be the RIO measurement device 110C or the motion control interface card 138, shown in FIG. 1C, or any of the RIO devices shown in FIGS. 1A-2B, or any other type of measurement or control device as desired.

As shown in FIG. 3A, the RIO card 110E preferably includes programmable hardware element 106. In one embodiment, the programmable hardware 106 may comprise a field programmable gate array (FPGA) such as those available from Xilinx, Altera, etc. The RIO card 110E may also include a non-volatile memory 288 coupled to the programmable hardware element 106. In this embodiment, the non-volatile memory 288 may be used for storing FPGA state information which may be used to initialize, configure, or program the FPGA 106 to perform a measurement or control function or implement an interface, as described above.

In one embodiment, the programmable hardware element 106 may be operable to perform one or more of: I/O interfacing, timing and triggering, inline processing, and embedded decision-making. For example, new triggering options or a different mix of counters may be implemented on the programmable hardware element 106 for an application. In converting the program into the hardware implementation form, the computer system 102 may generate a hardware description which is usable to configure the FPGA 106 to perform the functionality as specified in the program. Note that the term "hardware description" may refer generally to intermediate and final forms of the implementation, or may refer specifically to the form of the program used to generate a netlist. The conversion process and specific intermediate forms of the converted program are described in detail below with reference to FIGS. 12 and 13.

The RIO card 110E may also include one or more fixed hardware resources 204. The fixed hardware resources 204 may be coupled or connected at the boundary of the programmable hardware element 106. The fixed hardware resources 204 may provide various dedicated hardware functionality that may be used in conjunction with the programmable hardware element 106. In one embodiment, these fixed hardware resources 204 may provide various types of functionality, including one or more of: 1) control and data path to a host computer; 2) I/O interfacing to the external system; 3) optimized hardware elements; and/or 4) basic operating services. For example, the fixed hardware resources may comprise fixed physical I/O resources, including ADCs, DACs, and digital lines, among others.

In one embodiment, these resources are low-level building blocks that may be used in creation of the system. As noted above, these fixed hardware resources 204 may be used in conjunction with or by the programmable hardware element 106, wherein the configuration deployed onto the programmable hardware element 106 can use or build on these blocks to define a measurement and/or control system.

As also shown in FIG. 3A, the RIO card 110E may include an I/O connector 202 which is operable to send/receive signals. The I/O connector 202 may present analog and/or digital connections for receiving/providing analog or digital signals, such as image signals, pixel data, or any other type of signal or data, such as from a sensor or actuator 112. In one embodiment, the I/O connector 202 may be adapted for coupling to an external camera. The I/O connector 202 may be an example of a fixed hardware resource 204.

Thus, in one embodiment, everything behind the I/O can be redefined as desired to implement a given functionality, i.e., only the physical I/O is static (e.g., more ADCs can't generally be added, unless a mixed signal FPGA, described below, is configurable to implement them). The configuration for the programmable hardware element 106 may be "tuned" to a specific application, and may therefore minimize incompatibilities between the application and system hardware.

As one example, the fixed hardware resources 204 may comprise resources referred to as data acquisition (DAQ) logic 204. As shown, the data acquisition logic 204 may comprise analog to digital (A/D) converters, digital to analog (D/A) converters, timer counters (TC) and signal conditioning (SC) logic as shown. The DAQ logic 204 may provide data acquisition functionality of the I/O device 110E. In one embodiment, the DAQ logic 204 comprises 4 A/D converters, 4 D/A converters, 23 digital I/Os, a RTSI connector, and a TIO. This extra hardware is useful for signal processing and motion control applications. The programmable hardware element 106 may be coupled to the DAQ logic 204 and may also be coupled to a local bus interface 208, described below. The programmable hardware element or FPGA 106 may access these resources directly, thereby enabling creation of very powerful data processing applications, among others.

As shown, the RIO card 110E may further include bus interface logic 216 and a control/data bus 218. In one embodiment, the RIO card 110E is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface. The bus interface logic 216 and the control data bus 218 may be examples of fixed hardware resources 204.

The RIO card 110E may also include local bus interface logic 208. The local bus interface logic 208 may interface to a local bus used for data transfer. In one embodiment, the RIO card 110E may present a RTSI (Real Time System Integration) bus for routing timing and trigger signals between the RIO card 110E and one or more other devices or cards, such as a motion device. The local bus interface logic 208 and/or the RTSI bus may each also be an example of a fixed hardware resource 204.

Thus, in addition to the programmable hardware element 106, the RIO card 110 may include fixed hardware resources 204 which may operate in conjunction with the programmable hardware element 106 to perform measurement and/or control functions. Said another way, after the hardware description is deployed onto the programmable hardware element 106, the programmable hardware element 106 may be operable to directly perform a first portion of the measurement function, and invoke the one or more fixed hardware resources 204 to perform a second portion of the measurement function. In other words, the first portion of the measurement function is actually performed by the programmable hardware element 106, while the second portion of the measurement function, although initiated or directed by the programmable hardware element, is actually performed by the fixed hardware resources 204. Thus, the hardware description may specify the first portion of the measurement function to be performed directly by the programmable hardware element, and usage of the one or more fixed hardware resources 204 by the programmable hardware element 106 to perform the second portion of the measurement function.

As mentioned above, in a preferred embodiment, the FPGA may be configured by the computer system 102 by implementing a program, such as a graphical program, on the FPGA. If the (graphical) program contains portions which are only executable on a processor (as opposed to a programmable hardware element 106), then those portions may be executed by a different part of the system, such as by a processor comprised in the computer system 102. Thus in the embodiment of FIG. 3A, any supervisory control portion of the graphical program which is necessary or desired to execute on a programmable processor in software may be executed by the host CPU in the computer system 102, and is not executed locally on the RIO card 110E. Thus a graphical program can be created on the computer 102, or on another computer in a networked system, and at least a portion of the graphical program can be converted into a hardware implementation form for execution in the FPGA 106 or by fixed hardware resources 204. The portion of the graphical program converted into a hardware implementation form is preferably a portion which requires fast and/or real time execution.

FIG. 3B—a RIO with Programmable Hardware and Processor

In the embodiment of FIG. 3B, in addition to the programmable hardware 106 (FPGA), a RIO card 110F may further include a dedicated on-board processor 212 and memory 214. In various embodiments, the processor 212 may comprise one or more of a processor and memory, a micro-controller, and a digital signal processor (DSP). This enables a portion of the graphical (or other) program to be compiled into machine language for storage in the memory 214 and execution by the processor 212. A portion of the graphical program may also (or instead) be transferred to the memory 214 in its native format for execution by the processor. This may be in addition to a portion of the graphical program being converted into a hardware implementation form in the FPGA 106. The memory 214 may store a real time operating system (RTOS) for execution by the processor 212. Where the graphical program executes in its native format on the device 110F, the memory may also store a graphical program execution engine (e.g., LabVIEW RT) that is executed by the processor 212.

Thus, in one embodiment, after a graphical program has been created, a portion of the graphical program may be transferred and/or compiled for execution on the on-board processor 212 and executed locally on the RIO card 110F via the processor 212 and memory 214, and a second portion of the graphical program may be translated or converted into a hardware executable format and downloaded to the FPGA 106 for hardware implementation. One example of this is a mixed LabVIEW RT/LabVIEW FPGA embodiment, where a first portion of a LabVIEW graphical program executes on a processor and memory (e.g., LabVIEW RT), and a second portion (which may require more real time deterministic operation) executes in the FPGA.

As mentioned above, as one example, a first portion of a block diagram (that requires real time or fast execution) of a graphical program may be converted into a hardware executable format and downloaded to the FPGA 106 for hardware implementation, and a second portion of a block diagram (that may not require real time performance) may be stored in the memory 214 as program instructions and executed by the processor 212, in either a compiled or interpreted manner. As another example, a portion or all of the block diagram portion of the graphical program may be converted into a hardware executable format and downloaded to the FPGA 106 for hardware implementation, and a user interface portion (or front panel portion) of the graphical program may be stored in the memory 214 as program instructions and executed by the processor 212, in either a compiled or interpreted manner. Thus the portion of the graphical program which requires the most real time or deterministic (reliable and consistent) performance may be executed directly in hardware for fast operation, and other parts of the block diagram, or the user interface portion, which may not require real time performance, may execute on the processor 212. Where the processor 212 executes the user interface portion, the processor 212 may then send resulting signals to the video subsystem for display of the user interface on the computer display. The host computer CPU may also execute the user interface portion instead of the processor 212.

In one embodiment, the programmable hardware element itself may include a fixed, built-in ("hardcore") processor, where at least a portion of the measurement program is operable to be executed by the processor. In another embodiment, the programmable hardware element may be configurable to implement a processor ("softcore") which is operable to execute at least a portion of the measurement program.

As mentioned above, the programmable hardware 106 may comprise a field programmable gate array (FPGA) such as those available from Xilinx, Altera, etc. The programmable hardware element 106 may be coupled to the DAQ logic 204 and may also be coupled to local bus interface 208, described above.

As also mentioned above, in one embodiment, the RIO card 110F also includes a non-volatile memory 288, which may be coupled to the programmable hardware element 106, the processor 212 and the memory 214. The non-volatile memory 288 may be operable to store the hardware configuration program received from the host computer system to enable execution of the hardware configuration program in the programmable hardware element 106 prior to or during booting of the computer system 102. The non-volatile memory 288 may also store software transferred to the memory 214 and used by the processor 212, such as a RTOS and/or a graphical program execution engine.

As mentioned above, a typical example of a measurement I/O device or board may include a 16 channel multiplex A1 (analog input) in front of an A/D (analog to digital) converter, 2 analog outputs (AO), 8 digital lines, ~10 timing/triggering lines, 2 general purpose counters, plus one or more timing/triggering engines. Generally, the timing/triggering engines and digital logic for inter-component communications and for communicating with a host are comprised in an Application Specific Integrated Circuit (ASIC). The ASIC is a fixed functionality integrated circuit, and is thus not generally subject to modification by a user. As also mentioned above, there may be many applications whose requirements don't exactly match this set of resources.

In one embodiment, the programmable hardware element 106 (e.g., the FPGA) of a RIO device 110 may partially or completely replace the ASIC, i.e., the onboard digital logic, thereby providing a means to configure or program application specific components as required. For example, in one embodiment, the FPGA 106 may couple to an ADC via one or more digital lines. The FPGA 106 may comprise an array of configurable low level digital pins (rudiments) which may be defined or configured to implement digital lines and logic. Thus, by replacing the standard DAQ digital (and optionally, analog) logic in a system or card with a reconfigurable core or programmable hardware element 106, e.g., an FPGA, the functionality of the system or card may be defined by the configuration of the programmable hardware element 106. Additionally, the configuration may be downloaded "in the field," e.g., a pre-compiled configuration may be provided over a network or via wireless means to the RIO device 110 and installed on the FPGA 106 to implement the desired functionality. In one embodiment, this feature may be used to perform hardware updates on installed equipment remotely, thereby eliminating the need for a human to travel to the site and physically remove and replace the hardware. In another embodiment, new configurations for a hardware product may be defined and deployed after product release. For example, "hardware patches" fixing late bugs or flaws may be used in a similar manner as software patches in software systems.

For example, the low level digital pins which may be configured to implement digital filters, controls, counters, timing and triggering engines, and/or other digital components. In other words, the digital logic commonly provided by the ASIC may instead be provided by a suitably configured FPGA 106. In this way, the digital logic specifically required by the user (or application) may be configured on the FPGA, thereby providing a "custom fit" of the board or device to the requirements.

Some examples of functionality which a suitably programmed or configured programmable hardware element 106 may provide include, but are not limited to:

I/O lines—for example, input lines may be defined and grouped for specific functionality, and may include various counters, custom triggers, etc., as desired. For example, a group of 4 digital input lines may be dedicated for receiving input from an on-board ADC;

flexible timing/triggering—may provide higher level control of, organization of, and relationships between configured components, allowing groups of components to operate relatively independently from other groups of components, e.g., one group of components may operate at 1 MHz, while another group of components operates concurrently at 10 MHz; and algorithms—higher level constructs such as control loops, decisions, combinations of control structures, state machine decisions, control of analog and digital read/write operations, time stamps, etc., may provide software like logic and flow with hardware performance.

Thus, in one embodiment, the ADC, possibly operating under control of the programmable hardware element 106, may receive analog input from a sensor 112, and convert the analog signals to digital form. The configured FPGA 106 may receive the digital signals and process them according to the configured logic. The processed digital signals may then be routed to memory, to other components in the measurement device 110, and/or to an external system, such as the computer system 102. Other fixed hardware resources may also be arranged in the vicinity of the FPGA 106, such as DACs (digital/analog converter), DIOs (digital I/O ports), and/or any other type of circuit component.

In another embodiment, the FPGA 106 may be a mixed signal FPGA. As used herein, the term "mixed signal FPGA" refers to an FPGA which includes both digital gates and analog components. In one embodiment, the analog components may include relatively high-level components such as comparators, DAQs, filters, and ADCs, which may be used in conjunction with the configured digital logic and lines to provide any of a variety of measurement and/or control functions, as described above. In another embodiment, the analog components may include low-level analog components or rudiments such as transistors, op amps, capacitors, inductors, and/or resisters, from which higher-level analog components may be built or configured. Thus, if a user had need for an I/O card comprising an analog Butterworth filter and a 9-bit ADC, such a circuit could be configured on a RIO card or device 110. Additionally, if at a later time the user's requirements changed, the circuit could be modified to accommodate the new requirements.

Thus, the use of an FPGA 106 to implement digital logic in a measurement device provides a flexible solution to application specific digital logic requirements. Additionally, the use of a mixed signal FPGA extends the approach to include programmatically configurable analog components, which, in combination with the configurable digital logic, provides a broad, flexible solution approach to measurement and control system development. More specifically, various embodiments of the RIO system may provide improved I/O solutions for real time systems and applications (e.g., LabVIEW RT based applications), providing support, for example, for simultaneous sampling, synchronized A1, AO, DIO, and TIO (timed I/O), and balanced analog I/O, as well as providing a single point architecture. Additionally, RIO may facilitate use of a simplified register map, such as for interfacing with other systems. Finally, as noted above, RIO provides for customized functionality of measurement, control, automation, and simulation hardware, thereby providing the flexibility of software based systems with the performance of hardware.

Figure 4:
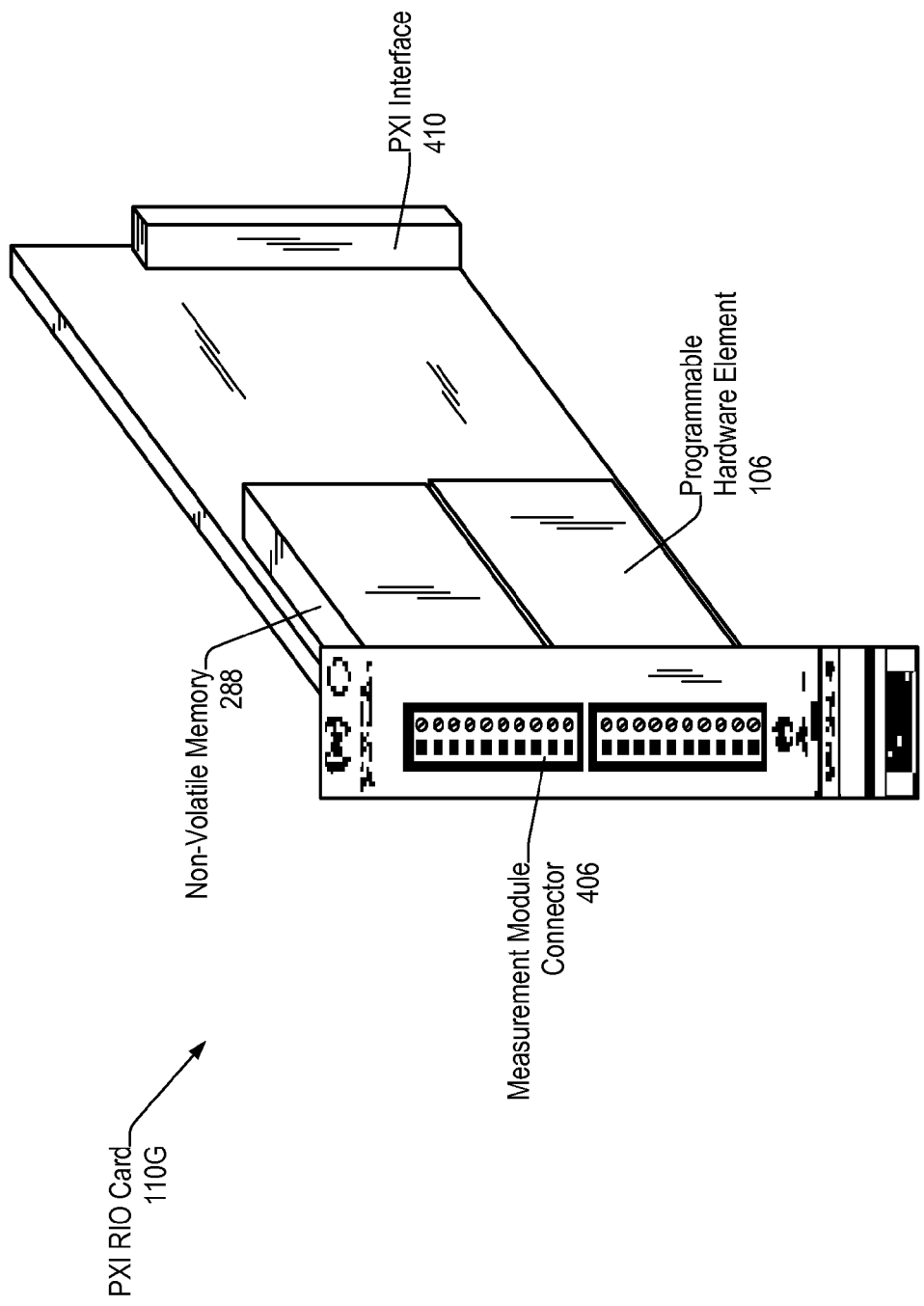
FIG. 4 illustrates a RIO card according to one embodiment.

FIG. 4—a PXI RIO Card

FIG. 4 illustrates a RIO card 110G, according to one embodiment. As described previously, the RIO card 110G includes a programmable hardware element 106 (e.g., an FPGA) which is operable to be programmed to perform various measurement and/or control functions, and/or to implement an interface for communicating with a measurement module 108. The RIO card 110G may also include various fixed hardware resources 204.

In this embodiment, the RIO card 110G may also include non-volatile memory 288, usable to store FPGA state information, such as a hardware description and/or an EDS specifying a measurement module interface, or configuration information which implements one or more measurement and/or control functions.

In this embodiment, the RIO card 110G is a PXI card. In other words, the RIO card is operable to plug into a PXI slot, such as on a computer system 102, or a PXI chassis. As FIG. 4 also indicates, the RIO card 110G may include bus interface circuitry, such as a PXI interface 410, for coupling to a PXI controller. Of course, the use of other controllers and corresponding interface circuitry is also contemplated, including PCI, VXI, USB, InfiniBand, Ethernet, Wireless (e.g., IEEE 802.11 Wireless Ethernet or Bluetooth), and IEEE 1394 (FireWire), among others. Thus, in one embodiment, the RIO card may be inserted into an expansion slot of a system, such as computer system 102 or chassis.

In one embodiment, the RIO card 110G may also include one or more measurement module connectors 406, each of which may be operable to couple to a measurement module 108, and which may be further usable to receive interface protocol information from the measurement module 108. As described above, the RIO card 110G may then be programmed (such as by computer system 102) to implement the communicated interface. As mentioned above with reference to FIG. 3B, the RIO 110G may include other resources (fixed hardware resources 204) besides those shown in FIG. 4, such as signal conditioners and/or converters, analog filters, AO and AI ports, and so forth, as desired. Additionally, as also mentioned above, the FPGA 106 may be coupled to various analog components as well, allowing a broad range of functionality to be configured on the RIO card 10G for a given application. Finally, the FPGA 106 may include low-level analog rudiments, thus allowing the configuration of an even greater number and type of measurement and/or control circuitry.

In another embodiment, the RIO card 110G may comprise a control board. As one example, the RIO control board 110G may be a PXI board running LabVIEW RT. The RIO control board 110G may also include a programmable hardware element 106. The RIO control board 110G may also include various fixed hardware resources. For example, the RIO control board 110G may include analog I/O comprising 8 analog inputs (AI) and 8 analog outputs (AO) operating at a certain frequency, e.g., between 1 kHz and 1 GHz (e.g., ~100 kHz), and capable of being simultaneously sampled and/or updated. In this embodiment, the RIO control board also includes 96 digital I/O lines which are synchronous to the AI and AO. Some or all of the digital lines may be consumed by counters and triggers. Exemplary configurations for this board include a continuous timed loop, different counter options, and single point architecture with no buffers. Additionally, the RIO control board may include a flash memory for storing the configuration for the board's programmable hardware element. Finally, for connectivity, the board may use three mini 68 pin connectors, or three 50 pin ribbon headers (which may reduce the DIO count to 48).

In yet another embodiment, the RIO card 110G may comprise a digital board having a processor and memory running LabVIEW RT, a programmable hardware element 106, and fixed hardware resources 204 comprising 160 digital I/O lines, various counters and triggers which may consume some or all of the digital lines, flash memory for storing the configuration for the board, and four mini 68 pin connectors for connectivity. Exemplary configurations include continuous timed loop, static input/output, different counter options, and single point architecture with no buffers.

Thus, in one embodiment, the RIO device 110G may be in the form of an adaptive interface card, such as a RIO PXI interface card, which includes a programmable hardware element 106 which is programmable to implement one or both of measurement and/or control functions and a measurement module interface.

Figure 5A:
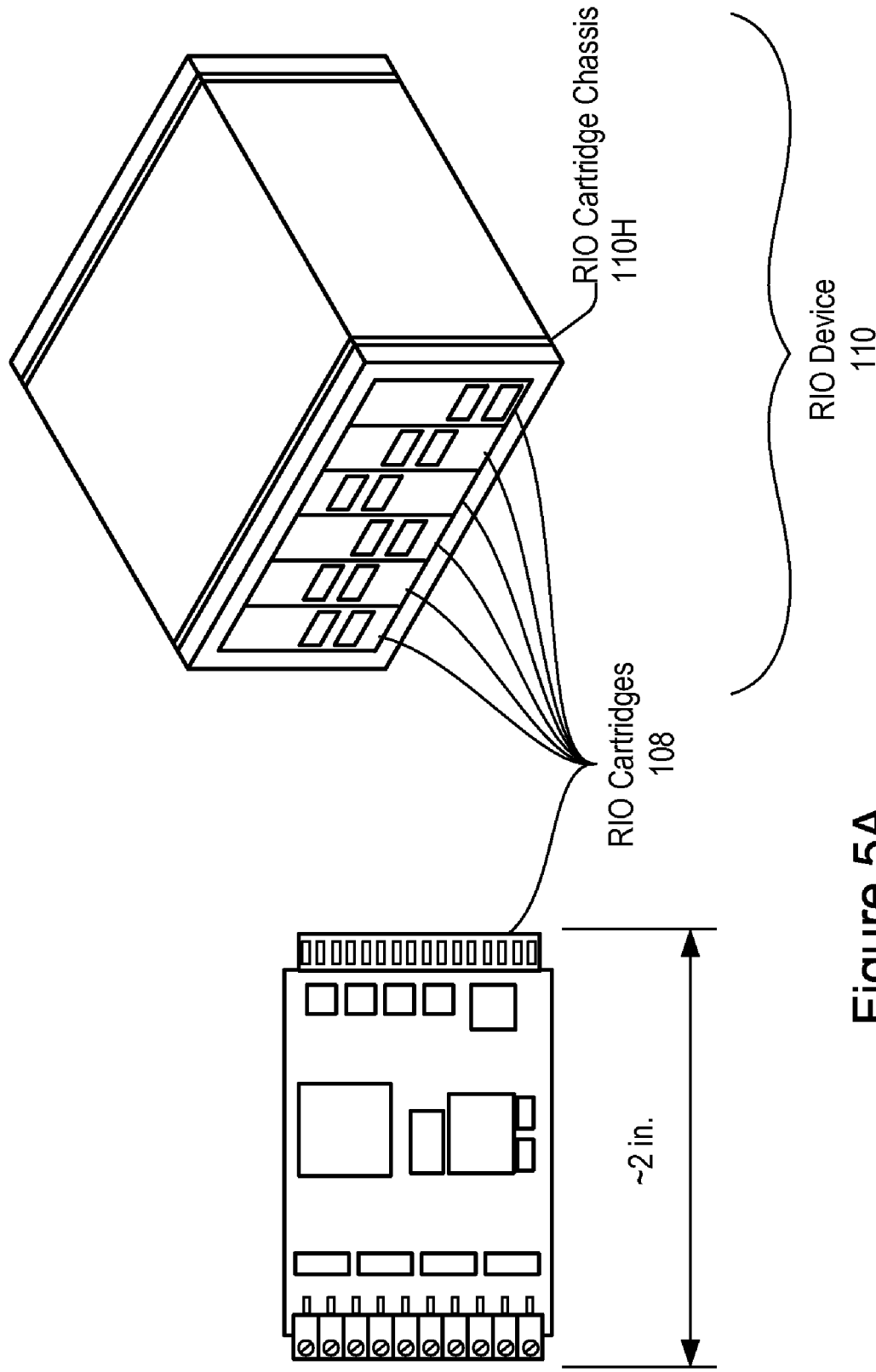

FIG. 5A—RIO Cartridge Carrier with Measurement Cartridges

FIG. 5A illustrates an embodiment where the RIO device 110 is in the form of a RIO cartridge chassis or carrier 110H, and one or more measurement cartridges (modules) 108. The RIO cartridge carrier 110H may comprise one or more slots which are operable to receive the one or more measurement cartridges 108, described in more detail below.

In one embodiment, the RIO chassis 110H may comprise a chassis, a backplane comprised in the chassis providing for electrical communication, and the one or more slots comprised in the chassis, in addition to the programmable hardware element 106 described above. Each of the one or more slots may include a connector that is coupled to the backplane, where each of the one or more slots may be adapted for receiving one of the measurement modules 108. Thus, the RIO chassis 110H may host a plurality of measurement cartridges 108, each of which may provide measurement and/or control functionality for a measurement or control operation or task. Each measurement module 108 may include fixed hardware resources 204 or a programmable hardware element 106, or both. The RIO chassis 110 may also be operable to communicate with each measurement cartridge (i.e., module) 108 and be programmed or configured (e.g., by a computer system 102) to implement the respective interface of each measurement cartridge 108. In this manner a suite of sensors 112 may be fielded, each of which feeds signals to a respective measurement cartridge 108 which in turn communicates through a respective interface (protocol) with the RIO device 110. Thus, the RIO device 110 may support a heterogeneous plurality of interfaces without having to include a heterogeneous set of interface hardware components.

In one embodiment, each measurement module or cartridge 108 may be operable to communicate with the RIO carrier 110H via SPI (Serial Peripheral Interface) 316, as described with reference to FIG. 5B below, although other interface protocols are also contemplated.

Additionally, in various embodiments, the RIO cartridge carrier 110H may be operable to provide communications between the measurement modules 108 and external systems. For example, the RIO cartridge carrier 110H may include logic to convert proprietary measurement module signal data into a standard format suitable for transmission to computer system 102. For another example, in one embodiment, the RIO cartridge carrier 110H may include an IP address and web server capabilities, and thus may be able to publish received signals or measurement data over the Internet. The RIO cartridge carrier 110H may similarly be operable to receive signal data over the Internet for processing. In another embodiment, one or more measurement cartridges 108 may also have an IP address and web server capabilities, and thus may be able to communicate with remote systems over the Internet, for example, to stream sensor data (e.g., numerical data or images) to a website for access by other systems or users.

In a preferred embodiment, the measurement modules 108 (or cartridges) may be easily removed, added, and replaced. In other words, measurement modules may be exchanged to change the configuration or capabilities of the measurement system. In one embodiment, the measurement module 108 may be replaced without powering down the measurement system, i.e., the measurement module 108 may be "hot-plugged" into the RIO 110. During operation of the measurement system, the measurement module 108 may communicate the interface protocol information to the RIO 110 upon attachment, and the RIO 110 is programmed in response, as described above. In another embodiment, the measurement module 108 and/or RIO 110 may require a reboot or reset after attachment to perform the described initialization.

For example, during operation of the measurement system, a new measurement module 108 (or cartridge) may be added (i.e., inserted or attached) to the RIO 110. The measurement system may automatically perform the initialization described above with respect to the added measurement module 108. In other words, during operation of the measurement system, the newly coupled measurement module 108 may communicate respective interface information to the RIO 110, which may then be programmed (e.g., by the computer system 102) to implement the respective interface, thereby enabling operations with the new measurement module 108. In one embodiment, the new measurement module 108 may replace another measurement module which was removed during operation of the measurement system.

Thus, the interface circuitry (i.e., the measurement module 108) may be operable to communicate the interface protocol to the RIO device 110 upon one or more of attachment of the measurement module 108 to the RIO device 110, reset of the measurement module 108, reset of the RIO device 110, reboot of the measurement module 108, and reboot of the RIO device 110.

As FIG. 5A shows, in a preferred embodiment, the measurement module or cartridge 108 may have a small form factor. For example, in one embodiment, the measurement module 108 may have dimensions less than or equal to approximately 1 inch by 2 inches by 3 inches. In one embodiment, the measurement module 108 may have dimensions of approximately 0.2 inches by 1 inch by 1 inch or more. An example form factor for the module 108 is shown in FIG. 5A as having a major dimension of 2 inches. Thus, in a preferred embodiment, the measurement module 108 has a compact form factor which may enable deployment in a variety of devices or carriers with minimal space requirements.

Thus, in one embodiment, each measurement cartridge 108 may include signal conditioning, ADC, microprocessor, and optional isolation, for sensor to digital operations. Additionally, each cartridge 108 may provide an SPI digital interface with simple protocol, and EDS/calibration history on board. In a preferred embodiment, the cartridges may have low channel counts, e.g., 4-channel analog, 8-channel digital.

The RIO cartridge carrier 110H is preferably able to convert SPI to standard bus/network signals, and implement power-on states, plug and play, and watchdogs. Additionally, the modules/cartridges 108 and/or the cartridge carrier may be provided with application-specific form factors and functionality. In other words, the cartridges and/or the cartridge carrier may be developed specifically to match the customers space and function needs. Example RIO carriers 110 may include, but are not limited to, a 4-slot Ethernet carrier (including IEEE 802.11 Wireless Ethernet), a 4-slot and 1-slot USB carrier, a multi-slot RIO carrier, a 1-slot wireless carrier, such as Bluetooth, and a CAN carrier, among others.

FIG. 5B—RIO Device with Multiple Measurement Modules

FIG. 5B is a block diagram of the RIO measurement system 110 of FIG. 5A above, comprising a RIO cartridge chassis or carrier 110H and a plurality of measurement modules 108, according to one embodiment. As FIG. 5B shows, the plurality of measurement modules 108 may include analog input module 108A, analog output module 108B, and digital I/O module 108C, as well as other measurement modules 108 not shown. Thus, the RIO cartridge chassis 110H may be operable to communicate with each measurement module 108 and be programmed or configured (e.g., by a computer system 102) to implement the respective interface of each measurement module 108. In this manner a suite of sensors 112 may be fielded, each of which feeds signals to a respective measurement module 108 which in turn may communicate through a respective interface (protocol) with the RIO 110, such as through SPI+316 or any other interface protocol or interface. Thus, the RIO 110 may support a heterogeneous plurality of interfaces without having to include a heterogeneous set of interface hardware components.

It should be noted that in various embodiments, the RIO 110 may be operable to perform other functions in addition to the adaptive interface functionality described above. For example, in one embodiment, the RIO 110 may include network control circuitry (or have a programmable hardware element configured to perform network control functions), and thus may comprise a networked measurement and control device, or a networked data acquisition device. In other words, the RIO unit 110 may comprise one or more of an Ethernet carrier, a USB carrier, and a wireless carrier (such as IEEE 802.11 Wireless Ethernet or Bluetooth), among others, to facilitate transmission of data over a network to external systems, e.g., the computer system 102.

As FIG. 5B shows, the RIO cartridge carrier 110H may also be operable to communicate with and through any of a variety of external systems and protocols, including, but not limited to, pass-through SPI+(breakout/cable to FPGA board); board bus (PXI, PC-104, InfiniBand, etc.); Bluebus/

FieldPoint adapter; network adaptors such as Ethernet, USB, CAN, and RS-232/485; wireless adapters such as 802.11B (Wireless Ethernet) and Bluetooth; handheld/PDA adapters such as Springboard, cradle, etc., and smart sensor modules, among others.

Figure 6:
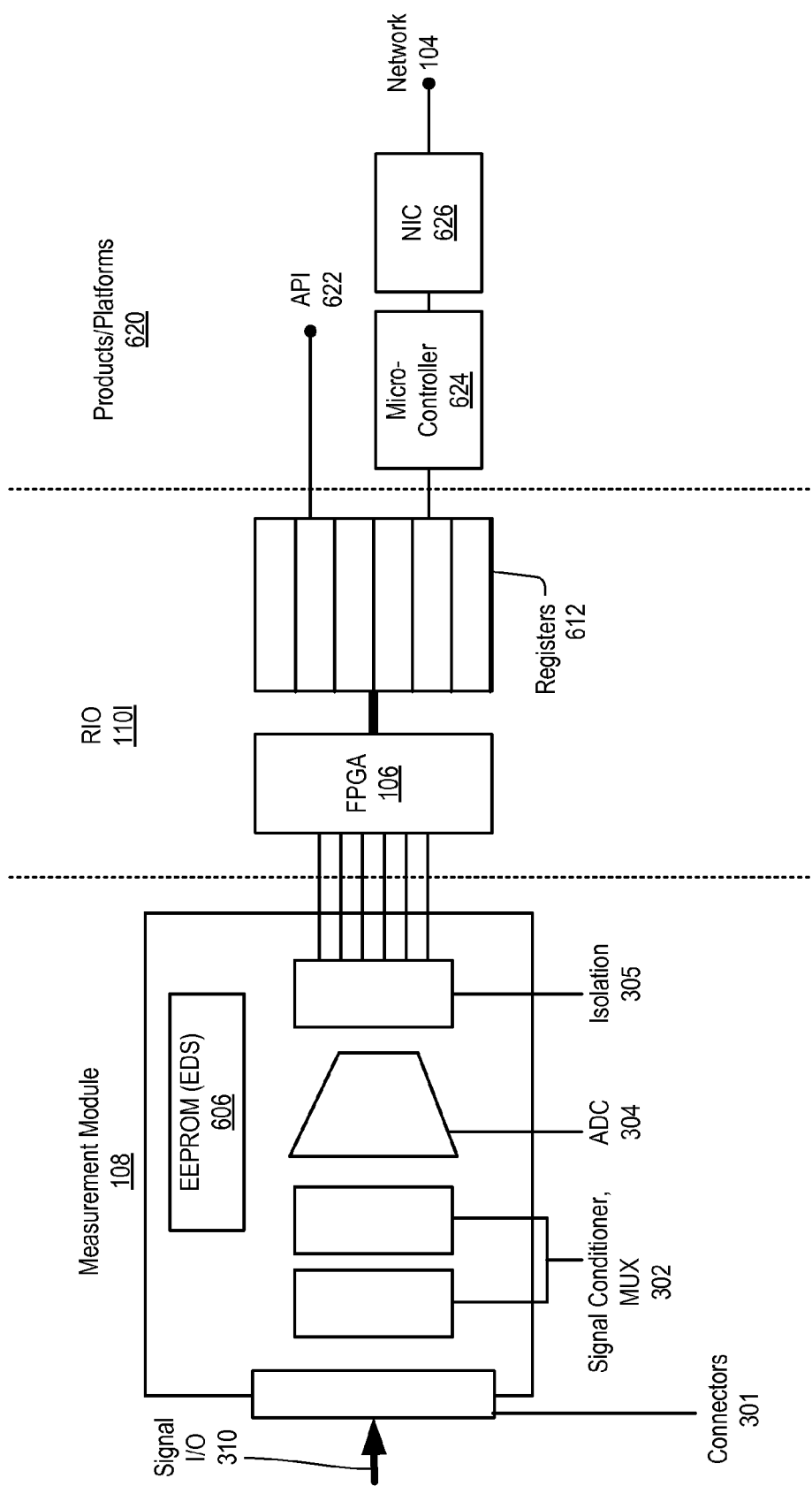
FIG. 6 is a block diagram of an architecture for a RIO system which includes a measurement module and a RIO carrier.

FIG. 6—Measurement Module and RIO Architecture

FIG. 6 is a block diagram of an architecture for a RIO system 110 which includes a measurement module 108 and a RIO carrier 110I. In this embodiment, the RIO carrier 110I includes not only the adaptive interface functionality described above, but also includes capabilities for performing one or more measurement and/or control functions.

As FIG. 6 shows, the measurement system may include measurement module 108, which may couple to the RIO carrier 110I through one or more communication lines or terminals, as shown. The RIO carrier 110I may in turn be operable to couple to any of various products or platforms 620, as indicated.

In one embodiment, the measurement module 108 may include connectors 301 for (analog) signal I/O, i.e., for communicating with a sensor or actuator 112. As shown, the connectors 301 may couple to signal conditioning circuitry 302, which in this embodiment includes a signal conditioner and a MUX. The signal conditioning circuitry 302 may couple to signal conversion circuitry, such as the ADC 304 shown, which may in turn couple to isolation circuitry 305, which may protect the module components from spurious voltage or current surges and mismatched impedances. In this embodiment, the measurement module 108 also includes an EEPROM 606 containing an EDS which may be operable to communicate the interface protocol information to the RIO carrier 110I, as described above. Thus, the measurement module 108 may provide a physical connection between the sensor or actuator 112 and the RIO carrier 110I, as well as signal conditioning, digitization, and isolation functions for the measurement system. In addition, in one embodiment, the measurement module 108 may provide identification (for Plug-and-Play (PnP)) and/or digital I/O (parallel and/or serialized) functionality.

As indicated in FIG. 6, the RIO carrier 110I may include programmable hardware element 106, e.g., FPGA, which may be programmable to implement the interface specified by the measurement module 108, as described in detail above. In this embodiment, the RIO carrier 110I may also include a register set 612, through which communication with the products/platforms may be effected. In various embodiments, the RIO carrier 110I may provide additional functions which may include I/O scanning, timing and triggering, power-on states, logic, digital I/O timing/counting, data transfer and support for parallel and scanned backplanes, among others.

Thus, in the RIO system, the FPGA 106 may be configurable with measurement and/or control functions. Thus the FPGA 106 may perform measurement/control functions instead of, or in addition to, the computer system 102.

The products and platforms 620 indicated in FIG. 6 may provide means for the RIO carrier 110I to communicate with external systems. For example, an Application Programming Interface (API) 622 may allow external systems to read and/or write to the registers in the register set 612 to communicate and/or control the measurement system. For another example, a processor, e.g., a micro-controller 624, and a network interface card 626 may couple the registers to a network 104, through which communications with external systems may be facilitated. In one embodiment, the products and platforms 620 may be comprised in the RIO 110, while in other embodiments the products and platforms 620 may be external to the RIO 110, e.g., may be comprised in computer system 102.

In one embodiment, the RIO 110 may comprise or be coupled to a Personal Digital Assistant (PDA). Thus the PDA may comprise the RIO 110 and may include one or more slots for measurement modules 108. In other words, the PDA may itself be the RIO carrier. Alternatively, the RIO device 110 may be in the form of an optionally detachable RIO module, which may in turn couple to a measurement module 108. The measurement module 108 may in turn be operable to couple to a sensor or actuator, as described above. In one embodiment, the PDA may be operable to program the RIO 110 (i.e., the RIO's programmable hardware element 106) with the interface protocol information provided by the measurement module 108, as described in detail above. Alternatively, the PDA may be programmed as the RIO carrier 110. In one embodiment, the PDA may be further operable to provide functionality related to a measurement and/or control task or operation. In another embodiment, the PDA may be used as an interface to another computer system 102. For example, a suitably equipped PDA may provide wireless communication for the RIO 110/measurement module 108.

Figure 7:
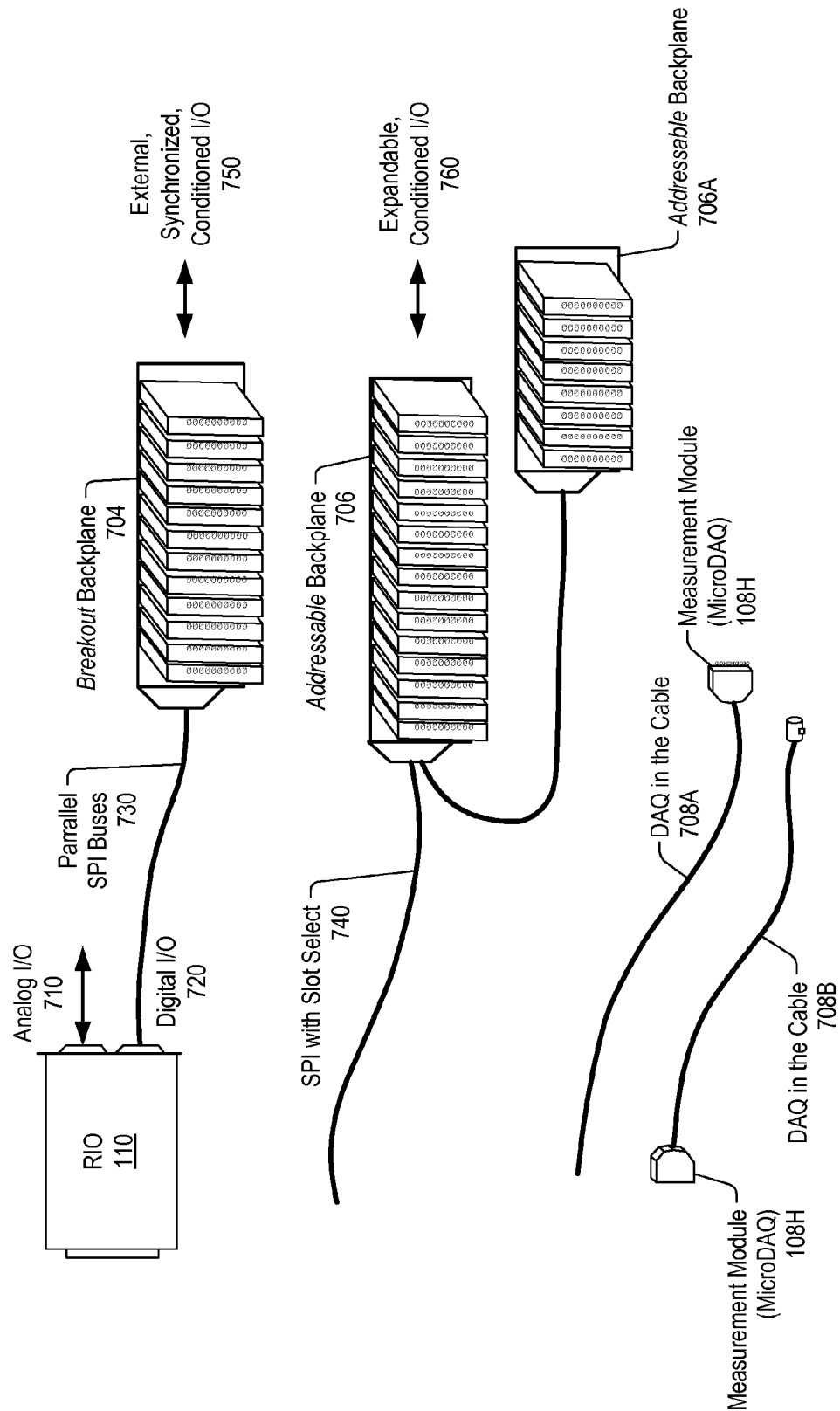
FIG. 7 illustrates several embodiments using a RIO card with external I/O expansion.

FIG. 7—RIO System with External I/O Expansion

FIG. 7 illustrates several embodiments using a RIO card 110 with external I/O expansion, i.e., with additional I/O connections for coupling to a plurality of measurement modules 108. As FIG. 7 shows, a RIO cartridge or card 110 may provide connectors for analog I/O 710 and/or digital I/O 720. As may be seen, without the use of expansion I/O devices, the number of measurement modules 108 which may be coupled to the RIO card 110 may be limited, e.g., to one.

In one embodiment, the digital I/O 720 may couple to a breakout backplane 704, for example, via parallel SPI buses 730, as shown, although other buses for coupling the I/O expansion devices to the RIO 110 are also contemplated. The breakout blackplane 704 may provide connectivity for a plurality of measurement module cards or cartridges 108, and may thereby be operable to facilitate external, synchronized, and conditioned I/O 750 for the measurement system. For example, each measurement module or cartridge 108 comprised in or on the breakout backplane 704 may be operable to couple to a sensor or actuator 112. Each measurement module 108 may also couple to the backplane 704. The breakout backplane 704 may then facilitate synchronization between the various measurement modules 108. Additionally, as described above, the measurement modules 108 may provide any of a variety of DAQ, measurement, and control functions, including signal conditioning and conversion, and thus external, synchronized, and conditioned I/O 750 capabilities may be included in this embodiment.

In another embodiment, the RIO card or device 110 may couple to an addressable backplane 706, for example, through an SPI with slot select capabilities 740. In other words, the addressable backplane 706 may provide a plurality of individually addressable slots for a plurality of measurement modules or cartridges 108, described above, which may each be individually targeted for communication by the RIO 110. Additionally, the addressable backplane 706 may be expandable, i.e., additional addressable backplanes 706A may be coupled to the addressable backplane 706 to provide additional slots for additional measurement modules 108. Thus, in this embodiment, expandable, conditioned I/O capabilities 760 may be provided by the system.

In yet another embodiment, the RIO card or device 110 may couple to a "DAQ in the cable" 708, where a measurement module 108 may be comprised in a cable connector. In other words, the features of a measurement module 108, as described above, may be included in one or both connectors of a cable, as shown. For example, in the example of DAQ in cable 708A, one end of the cable may be coupled to the RIO device 110, and the measurement module/connector 108 may be operable to couple to a sensor or actuator 112. In another example, the DAQ in cable 708B may comprise measurement module 108 which may be operable to couple to the RIO card 110, and another cable connector (without a measurement module 108) for coupling to a sensor/actuator 112.

Thus, in various embodiments, the functionality of one or more measurement modules 108 may be provided through the use of I/O expansion devices (e.g., devices 704, 706, and 708) which may extend the I/O capabilities of the RIO device 110. Furthermore, in some embodiments, additional functionality may be provided by the expansion device, such as the ability to synchronize the I/O.

Figure 8:
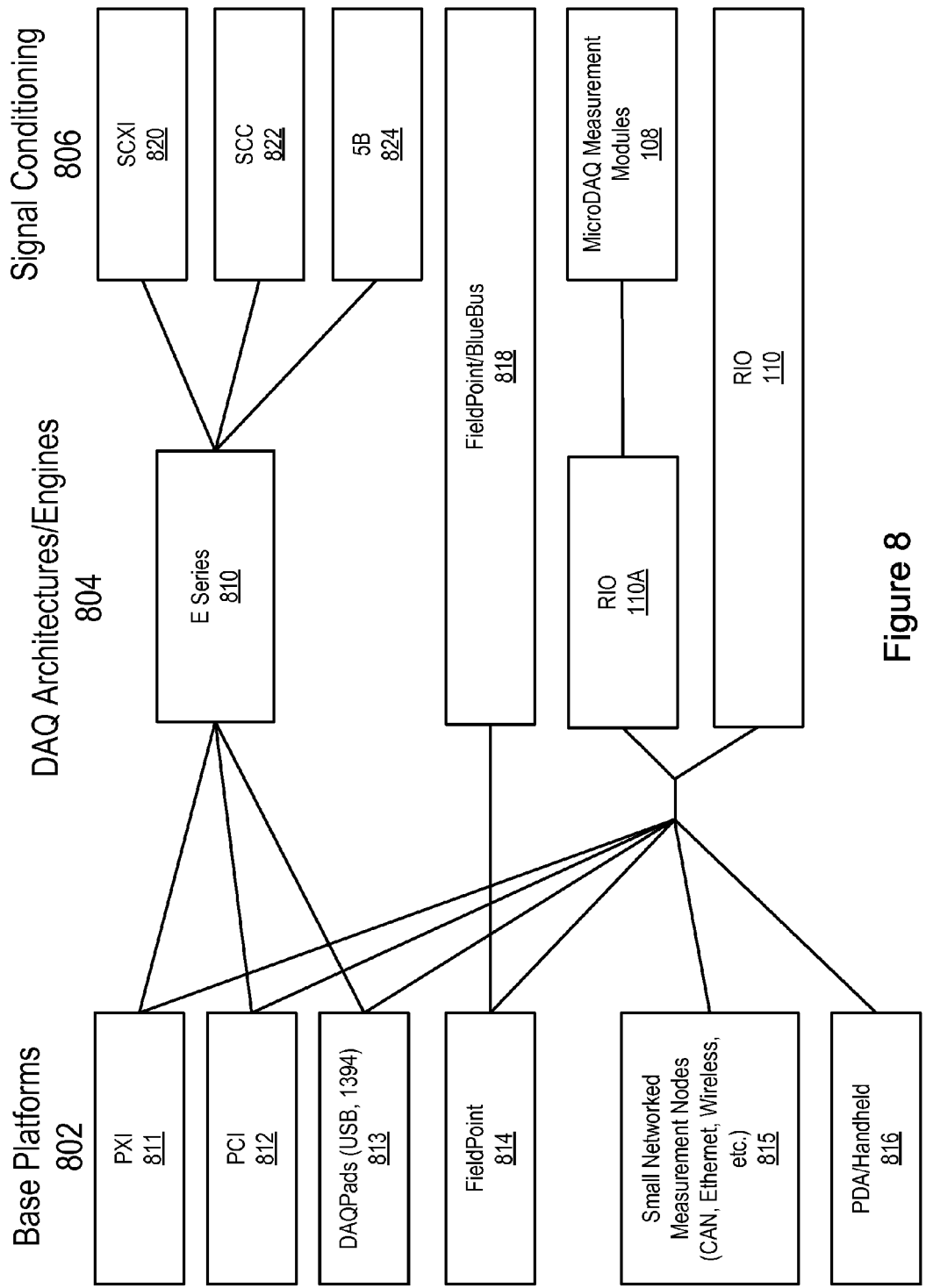
FIG. 8 illustrates embodiments with respect to platforms, DAQ architectures/engines, and signal conditioning.

FIG. 8—Platforms and Technology

FIG. 8 illustrates embodiments with respect to platforms, DAQ architectures/engines, and signal conditioning. As FIG. 8 shows, a plethora of different measurement and/or control systems may be developed using various combinations of base platforms 802, DAQ architectures/engines 804, and signal conditioning devices or systems 806. In particular, the broad application of RIO technology is illustrated.

For example, any of a number of base platforms 802 may be used to provide a connectivity infrastructure for the system, including, but not limited to, PXI 811, PCI 812, DAQ-Pads 813 (from National Instruments) which may utilize USB, 1394, etc., FieldPoint 814, small networked measurement nodes 815, and PDAs/handheld computers 816.

DAQ architectures/engines 804 which may be selected include, but are not limited to, the National Instruments E Series of DAQ devices 810, FieldPoint/BlueBus 818, and RIO devices 110 and 110A (or other RIO embodiments).

Signal conditioning technologies 806 which may be used in such systems include (but are not limited to) National Instruments SCXI 820, SCC 822, and 5B 824 signal conditioners, as well as FieldPoint/BlueBus compliant signal conditioners, and measurement modules 108, such as National Instruments measurement modules.

As FIG. 8 indicates, components or standards may be selected from each class of component (platforms 802, engines 804, signal conditioners 806), and, depending on compatibility, combined to develop a wide variety of measurement systems. For example, E Series engines 810 may be combined with a PXI platform 803, a PCI platform 805, and/or a DAQPads platform 807, and may further be combined with SCXI 820, SCC 822, and 5B 824 signal conditioners, while the FieldPoint/BlueBus engine 812 (which also provides signal conditioning functionality) may only be combinable with the FieldPoint platform 808.

In contrast, it is contemplated that the RIO engine/architecture may be combined with all of the listed platforms 802, i.e., PXI platform 811, PCI platform 812, DAQPads platform 813, FieldPoint platform 814, small networked measurement nodes 815, and PDA/handhelds 816), as well as other platforms not shown, e.g., InfiniBand, USB, 1394/FireWire, etc. Note that use of the RIO engine/architecture facilitates combinations with RIO signal conditioning devices 110 and measurement modules 108, respectively, for signal conditioning functions 806, as shown. The RIO engine/architecture may also be used with any of the signal conditioning options 806 shown in FIG. 8, including SCXI, SCC, 5B, Fieldpoint/Bluebus, and other types of signal conditioning or measurement modules.

In one embodiment, the combination of a RIO device 110 with measurement modules 108 is generally capable of providing any of various desired capabilities.

The RIO technology may be implemented or comprised in any of various platforms. For example, a RIO device 110 may be included in a smart sensor. In another embodiment, the RIO device 110 may include wireless logic for wireless communication with external systems, including sensors 112 and/or computer systems 102. In another embodiment, the RIO device 110 may include an interface for industrial automation, i.e., an industrial automation interface bus, such as CAN, Devicenet, and Fieldbus, among others.

Thus, the use of measurement modules 108 and various RIO units 110 may provide complementary and overlapping functionality as compared to current approaches to development of measurement systems, and may also provide substantial cost, efficiency, and flexibility benefits. In particular, the use of RIO devices 110 and/or measurement modules 108 leverages semiconductor technology to deliver highly modular measurement, control, and signal conditioning/conversion functionality which may be reusable in many platforms, e.g., USB, Ethernet, FieldPoint, RIO, PDAs, etc., and which may lower risk and effort in supporting new platforms, such as wireless, CAN, etc.

Loop Synchronization Between RIO Device and Host Computer CPU

In some embodiments, a RIO device 110 may operate together with a host computer system 102 to perform a measurement and control function. For example, an FPGA or other programmable hardware element of a RIO device 110 (or other measurement device) may be configured to perform a loop in which measurement data is acquired during each iteration of the loop. The measurement data may be acquired from a physical system coupled to the RIO device 110 via one or more sensor devices. The processor (CPU) of the host computer may perform another loop which reads the measurement data from the RIO device 110 during each iteration and uses the measurement data to perform a measurement and control function or algorithm, e.g., by performing various calculations based on the measurement data. The loop performed by the CPU may also generate control data for controlling the RIO device 110, and may write the control data to the programmable hardware element of the RIO device 110. In various embodiments the RIO device 110 and the host computer 102 may function together in this manner to perform any of various kinds of measurement and control functions or algorithms which use measurement data acquired from any of various kinds of physical systems.

In addition to executing program instructions that implement the loop which performs the measurement and control algorithm using the measurement data, the CPU of the host computer 102 may also execute program instructions that implement a synchronization algorithm to keep the loop performed by the FPGA (or other programmable hardware element) of the RIO device 110 synchronized with the loop performed by the CPU. In this synchronization algorithm, the loop performed by the CPU effectively acts as a master loop. The timing of the iterations of the loop performed by the FPGA may be varied as necessary to keep them synchronized with the iterations of the loop performed by the CPU. As described in detail below, the synchronization algorithm may operate to determine values used to program timers on the FPGA in order to keep the loop on the FPGA running with the same phase and period as the loop running on the CPU.

Figure 9A:
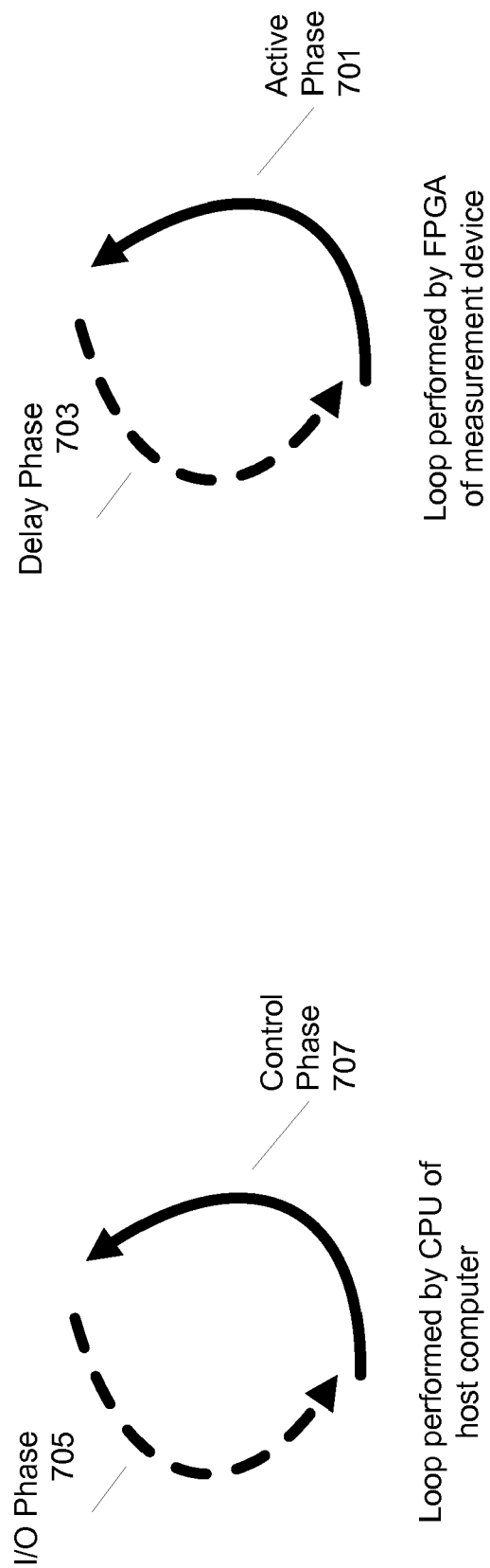
FIG. 9A illustrates a loop running on a host computer CPU, and another loop running on an FPGA of a RIO device or other measurement device.

The left side of FIG. 9A illustrates the loop running on the host computer CPU, and the right side of FIG. 9A illustrates the loop running on the FPGA of the RIO device 110 or other measurement device. Each iteration of the loop on the FPGA has two phases, referred to as the active phase 701 and the delay phase 703. During the active phase of each iteration, the FPGA may store measurement data in a memory device (e.g., a memory device of the FPGA). The measurement data may be acquired from one or more I/O devices which sample and convert signals received from a physical system. During the delay phase of each iteration, the FPGA does not store measurement data in the memory device, but instead waits for the CPU of the host computer 82 to read the measurement data from and/or write control data to the memory device. In some embodiments the FPGA may simply be idle during the delay phase of each iteration. In other embodiments the FPGA may acquire new measurement data during the delay phase, but may not write the new measurement data to the memory device until the next active phase begins.

As illustrated in FIG. 9A, each iteration of the loop executed by the host computer CPU also has two phases, referred to as the I/O (or input/output) phase 705 and the control phase 707. During the I/O phase, the CPU reads measurement data from the memory device on the FPGA, as well as possibly writing control data to the memory device on the FPGA. During the control phase, the CPU performs a measurement/control algorithm using the measurement data. In some embodiments the measurement/control algorithm may operate to generate the control data to be written to the FPGA in order to control the FPGA, e.g., in order to cause the FPGA to control or interact with the physical system in a desired way. Thus, the loop executing on the CPU and the loop on the FPGA effectively provide feedback to each other through the measurement data and control data.

The two loops may be designed to execute in synchronization with each other such that the I/O phase of each iteration of the CPU loop completes within the delay phase of a corresponding iteration of the FPGA loop. The phase of the loop that samples and converts the measurement data (the loop performed by the FPGA) needs to stay synchronized with the loop that performs the measurement and control algorithm (the loop performed on the CPU), or else artifacts may occur, such as noise, aliasing, etc.

Figure 9B:
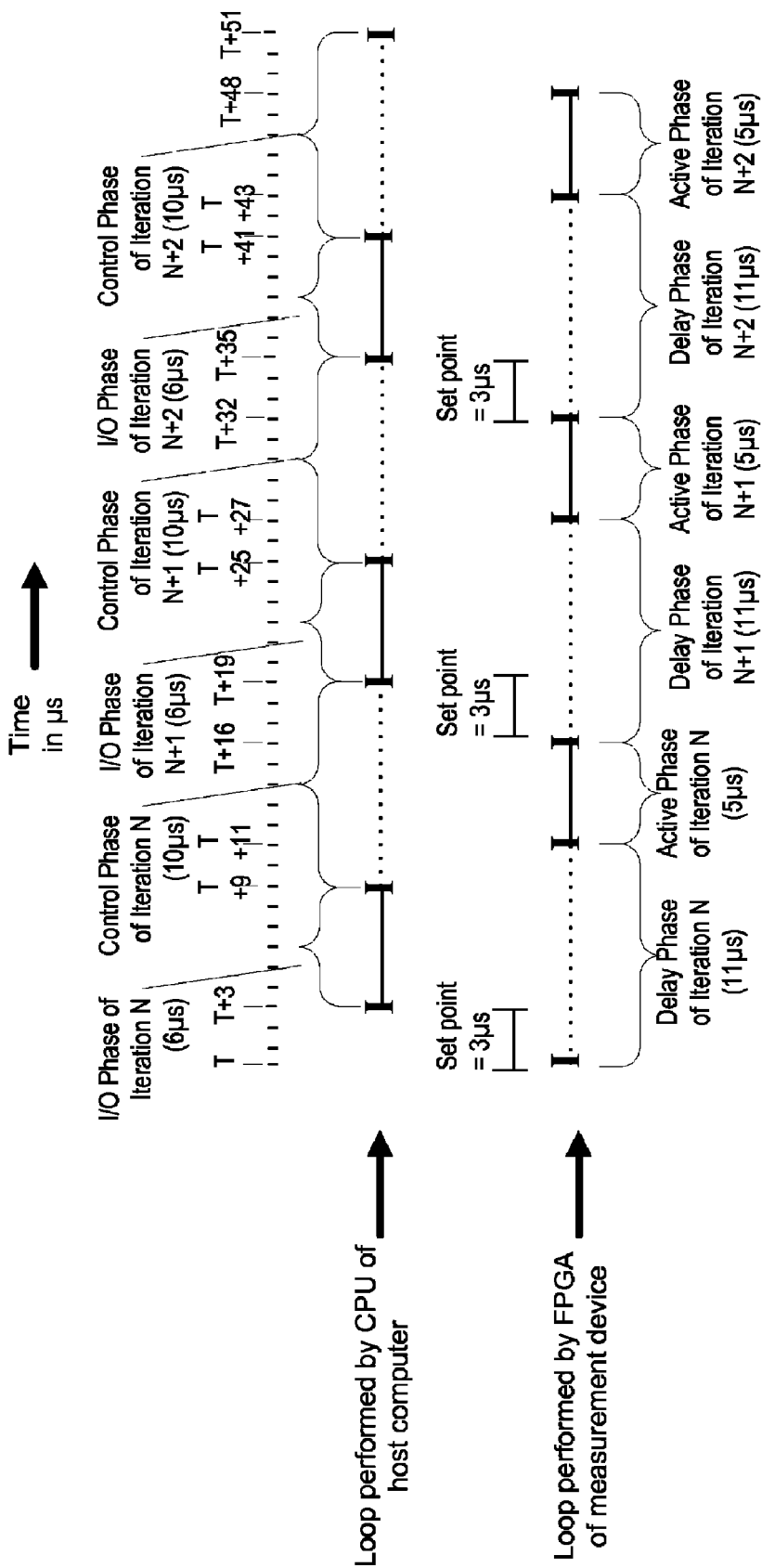
FIG. 9B illustrates an example of the loop performed by the FPGA of the measurement device executing in synchronization with the loop performed by the CPU of the host computer, where the delay phase of each iteration of the FPGA loop overlaps the I/O phase of the corresponding iteration of the CPU loop in time.

FIG. 9B illustrates an example of a loop performed by the FPGA of the measurement device executing in synchronization with a loop performed by the CPU of the host computer, where the delay phase of each iteration of the FPGA loop overlaps the I/O phase of the corresponding iteration of the CPU loop in time.

In this example, the delay phase of the FPGA loop is designed to last for 11 μs, and the active phase of the FPGA loop is designed to last for 5 μs. The I/O phase of the CPU loop is designed to last for 6 μs, and the control phase of the CPU loop is designed to last for 10 μs. (It is noted that these numbers are given to illustrate a simple example. In a typical real-world example, various ones of these phases may last any length of time, but would typically last considerably longer.)

As illustrated in FIG. 9B, the delay phase of an iteration N of the FPGA loop (e.g., the Nth iteration of the loop performed by the FPGA) may begin at a time T and complete at a time T+11 μs. The active phase of the iteration N of the FPGA loop then begins at the time T+11 μs and lasts for 5 μs, ending at the time T+16 μs.

The I/O phase of each iteration of the CPU loop may be designed to begin at an expected time of 3 μs after the delay phase begins in the corresponding iteration of the FPGA loop. This amount of time expected to elapse between the time when the delay phase begins in a particular iteration of the FPGA loop and the time when the I/O phase begins in the corresponding iteration of the CPU loop is referred to herein as the "set point". Since the set point is 3 μs in this example, the I/O phase of the iteration N of the CPU loop (e.g., the Nth iteration of the loop performed by the CPU) begins 3 μs after the time T at which the delay phase begins in the iteration N of the FPGA loop, i.e., at T+3 μs. The I/O phase lasts for 6 μs and ends at the time T+9 μs. The control phase of the iteration N of the CPU loop then begins at the time T+9 μs and lasts for 10 μs, ending at the time T+19 μs. In the meantime, the delay phase of the next iteration (iteration N+1) of the FPGA loop starts at the time T+16 μs when the active phase of the iteration N completes. The I/O phase of the iteration N+1 of the CPU loop again starts at the set point of 3 μs afterward, i.e., at the time T+19 μs. The cycle continues to repeat in a similar fashion for the following iterations of the two loops (e.g, iteration N+2, N+3, etc.).

The example of FIG. 9B assumes that in both the CPU loop and the FPGA loop, every phase of every iteration begins at exactly the time it is supposed to and lasts the exact amount of time it is supposed to. This enables the FPGA loop to stay perfectly synchronized with the CPU loop. In a real-world example, however, various timing errors may occur which can cause the FPGA loop to become unsynchronized with the CPU loop. Thus, in addition to the loop which the CPU executes, the CPU may also execute a synchronization algorithm whose goal is to keep the two loops executing in synchronization with each other as illustrated in FIG. 9B. The synchronization algorithm may operate to alter the length of the delay phase for one or more iterations of the FPGA loop in order to keep the FPGA loop synchronized with the CPU loop, as described in detail below.

One problem that can cause synchronization errors is that the measurement and control loop that runs on the CPU of the host computer and the measurement data acquisition loop that runs on the FPGA of the measurement device are driven by different clocks. In other words, the measurement and control loop is driven by the clock of the host computer CPU, and the measurement data acquisition loop is driven by the clock of the FPGA. These two clocks may be driven by different crystals that will drift from one another so that there is no inherent way to lock synchronization of the loops between the two clocks. For example, natural error between the two clocks could be in the hundreds to thousands of parts per million (ppm).

The synchronization algorithm may correct for this problem by determining a relationship between FPGA clock ticks and CPU clock ticks in real time and adjusting the timing of the FPGA loop so that it is kept synchronized with the CPU loop. More particularly, the synchronization algorithm may keep the FPGA loop synchronized with the CPU loop by adjusting the length of the delay phase as necessary for various iterations of the FPGA loop. The length of the delay phase may be controlled by a timer of the FPGA, where the timer can be set to a specified number of clock ticks. In the example of FIG. 9B, the default or initial setting of the timer which controls the delay phase may be 11 μs since this is the default length of the delay phase. The timing of the iterations of the FPGA loop may be adjusted in real time by varying the number of clock ticks spent in the delay phase. The length of the active phase of each iteration of the FPGA loop may remain at a fixed value, e.g., 5 μs in the example of FIG. 9B.

At the beginning of the I/O phase of each iteration of the CPU loop, the synchronization algorithm executed by the CPU may operate to read the following three timers:

1) A CPU clock timer that reports real time (e.g., time in seconds). This timer is referred to as the CPU clock timer. The correlation between CPU ticks and real time may be managed by a framework that allows synchronization of the CPU to external entities, such as IEEE 1588 or NTP.

2) An FPGA timer that reports the number of FPGA clock ticks since an arbitrary epoch (point in time). This timer is referred to as the FPGA clock timer.

3) An FPGA timer that reports the number of FPGA clock ticks since the beginning of the current phase of the FPGA loop. This timer is referred to as the FPGA cycle timer. The current phase may be either the active phase or the delay phase, depending on when the FPGA cycle timer is read. The FPGA cycle timer also reports which phase (active phase or delay phase) is currently in effect.

In some embodiments it is important that these three timers be read close together in time, and have a deterministic amount of skew between the times at which they are read. The synchronization algorithm may accomplish this by reading the two FPGA timers atomically, e.g., in a single machine instruction, ensuring they are correlated to within a single clock cycle. In addition, the synchronization algorithm may also disable CPU interrupts while reading the three timers. This may ensure that the timer reads take place within a deterministic amount of time.

As discussed above, the timing of the two loops may be designed so that the I/O phase of each iteration of the CPU loop is expected to begin at a particular set point into the delay phase of the corresponding iteration of the FPGA loop, e.g., 3 μs in the example of FIG. 9B. Thus, the set point may be specified as a particular number of FPGA clock ticks expected to elapse between the time when the delay phase begins in a particular iteration of the FPGA loop and the time when the I/O phase begins in the corresponding iteration of the CPU loop.

At the beginning of the I/O phase of each iteration of the CPU loop, the synchronization algorithm executed by the CPU may operate to read the FPGA cycle timer in order to determine the actual number of FPGA clock ticks that have elapsed between the time when the delay phase of the current iteration of the FPGA loop began and the time when the I/O phase of the current iteration of the CPU loop began. This actual number of FPGA clock ticks is expected to be the same as the set point value, but may be either higher or lower, e.g., due to timing errors. The synchronization algorithm may calculate the difference between the actual number of clock ticks and the expected number of clock ticks (the set point value) and use the calculated difference to adjust the length of the delay phase of the current iteration of the FPGA loop. For example, the calculated difference (which may be either positive or negative) in clock ticks may be added to the timer which controls the length of the delay phase. The synchronization algorithm may communicate with the FPGA to cause the delay phase timer to be adjusted accordingly.

Consider again the example of FIG. 9B. The FPGA cycle timer may be read at the beginning of the I/O phase of an iteration N' of the CPU loop. The FPGA cycle timer is expected to be at 3 μs (the set point value). Suppose however that the FPGA cycle timer reports a value of 2 μs instead. Since the actual value is lower than the set point, this means that fewer clock cycles than expected have elapsed since the beginning of the delay phase of the corresponding iteration N' of the FPGA loop. Thus, if the delay phase lasts for its normal 11 μs then the delay phase will be 1 μs too long. In one embodiment, the synchronization algorithm may calculate a difference of −1 μs between the FPGA cycle timer value (2 μs) and the set point value (3 μs) and add this difference to the delay phase timer (currently set at 11 μs) to cause the delay phase to be shortened to 10 μs, which may effectively bring the FPGA loop back into synchronization with the CPU loop.

As another example, suppose that the FPGA cycle timer reports a value of 5 μs into the delay phase at the beginning of the I/O phase of the iteration N' of the CPU loop. Since the actual value is higher than the set point, this means that more clock cycles than expected have elapsed since the beginning of the FPGA delay phase of the corresponding iteration N' of the FPGA loop. Thus, if the delay phase lasts for its normal 11 μs then the delay phase will be 2 μs too short. Thus, the synchronization algorithm may calculate a difference of 2 μs between the FPGA cycle timer value (5 μs) and the set point value (3 μs) and add this difference to the delay phase timer (currently set at 11 μs) to cause the delay phase to be lengthened to 13 μs, which may effectively bring the FPGA loop back into synchronization with the CPU loop.

In other embodiments the synchronization algorithm may perform a more complex calculation to determine the number of clock cycles to add to or subtract from the delay phase timer. In each iteration, an "actual clock ticks" value may be defined as the actual number of FPGA clock ticks that have elapsed between the time when the delay phase of the current iteration of the FPGA loop began and the time when the I/O phase of the current iteration of the CPU loop began. A "set point difference" value may be defined as the "set point" value subtracted from the "actual clock ticks" value. In the examples above, the set point difference value for the current iteration is simply added to the delay phase timer. In other embodiments the synchronization algorithm may instead keep a moving average of the set point difference values for the past several iterations, and may use this moving average to adjust the delay phase timer. In some embodiments the current moving average may simply be added to the delay phase timer in each iteration. In other embodiments the current moving average may first be multiplied by a proportional factor, and the result may then be added to the delay phase timer. In some embodiments the host computer may execute software which implements a graphical user interface allowing the user to set the proportional factor to a desired value. This may allow the user to experimentally determine a proportional factor which achieves good synchronization results. In some embodiments the user may also be able to adjust the number of iterations whose set point difference values are used in the moving average.

In some cases the FPGA cycle timer may report that at the time when the I/O phase of the CPU loop starts, the FPGA loop is in the active phase instead of being in the delay phase as expected. For example, suppose that in the example of FIG. 9B the FPGA cycle timer reports a value of 4 μs into the active phase at the beginning of the I/O phase of an iteration N' of the CPU loop. In this example the synchronization algorithm knows that the total length of the active phase is 5 μs, so it can calculate that the FPGA loop is currently 1 μs from the end of the active phase. It also knows that the set point should be at 3 μs, so it can calculate that the FPGA loop is a total of 4 μs (1 μs+3 μs) late from where it should be.

Thus, in some embodiments the synchronization algorithm may operate to determine a number of clock ticks to be added to or subtracted from the FPGA delay phase. This may correct for natural error between the clock of the CPU and the clock of the FPGA. As discussed below with reference to FIG. 10, in some embodiments the synchronization algorithm may also perform various error checks to determine whether the FPGA loop is too far off (e.g., further than a particular error threshold value or percentage) from the expected set point value. If so then the current iteration may be skipped without adjusting the length of the delay phase, or the loops may be re-started entirely.

In further embodiments the synchronization algorithm may also correct for additional sources of timing errors, such as jitter of the CPU of the host computer. Jitter of the CPU may arise due to the CPU having to perform other tasks in addition to executing the measurement and control loop, such as handling bus traffic, servicing interrupts, performing other high priority tasks, etc. The CPU jitter may cause jitter in the loop executed by the CPU, e.g., so that the iterations of the CPU loop do not start at regular periodic intervals as intended. The amount of jitter for a given iteration of the CPU loop may be measured as the time difference between the time when the iteration was expected to start (as measured from the start time of the previous iteration based on the CPU loop's period) and the time when the iteration actually starts.

If the FPGA loop were kept in phase with the CPU loop only using the techniques described above, then the jitter in the CPU loop may effectively be introduced into the FPGA loop as well, which may cause noise in the measurement and control system. Some measurement and control algorithms require the time intervals between the respective times when the FPGA loop samples the measurement data in each iteration to remain more or less constant (e.g., constant to within about 500 nanoseconds). Variance by more than this amount of time can result in destructive noise in the measurement and control application due to the measurement data not being sampled at constant periodic time intervals. For example, this type of noise may be a particular problem in highly responsive mechanical systems that use high-precision motor drives.

The CPU loop may jitter from iteration to iteration, often by tens of microseconds. Thus, simply adding to or subtracting from the FPGA delay phase based on the actual difference between the start time of the delay phase of the FPGA loop and the start time of the I/O phase of the CPU loop as discussed above may not be sufficient to satisfy the constraint that the period of the FPGA loop should not vary by more than about 500 nanoseconds from iteration to iteration. Further embodiments of the synchronization algorithm may operate to satisfy this constraint by measuring jitter on the CPU and compensating for the jitter by applying a jitter correction factor to the delay phase of the FPGA loop iterations.

CPU jitter by its nature tends to sum to zero over time. The synchronization algorithm may use this property to factor out CPU jitter by keeping a running sum of the CPU jitter from iteration to iteration and adding the sum to the delay phase of each iteration of the FPGA loop together with the calculated set point difference discussed above. The amount of jitter for a given iteration of the CPU loop may be measured as the time difference (e.g., in CPU clock ticks) between the time when the iteration was expected to start (as measured from the start time of the previous iteration based on the CPU loop's period) and the time when the iteration actually starts. This difference in CPU clock ticks for each iteration of the CPU loop may be converted into FPGA clock ticks and added to a jitter correction factor, e.g., a variable that initially starts at zero.

For each iteration of the FPGA loop, the synchronization algorithm may add the current jitter correction factor along with the set point difference discussed above to the timer which controls the length of the delay phase. The CPU jitter typically tends to sum to zero over a relatively small period of time. For example, if the CPU loop period is N microseconds too long on one iteration then it will tend to be N microseconds too short on a subsequent iteration. Thus, the synchronization algorithm uses this property to effectively factor out the CPU jitter from the FPGA loop by applying the jitter correction factor to the delay phase of the FPGA loop. In some systems the achieved jitter in the FPGA loop may be two orders of magnitude lower than the jitter in the CPU loop.

Figure 10:
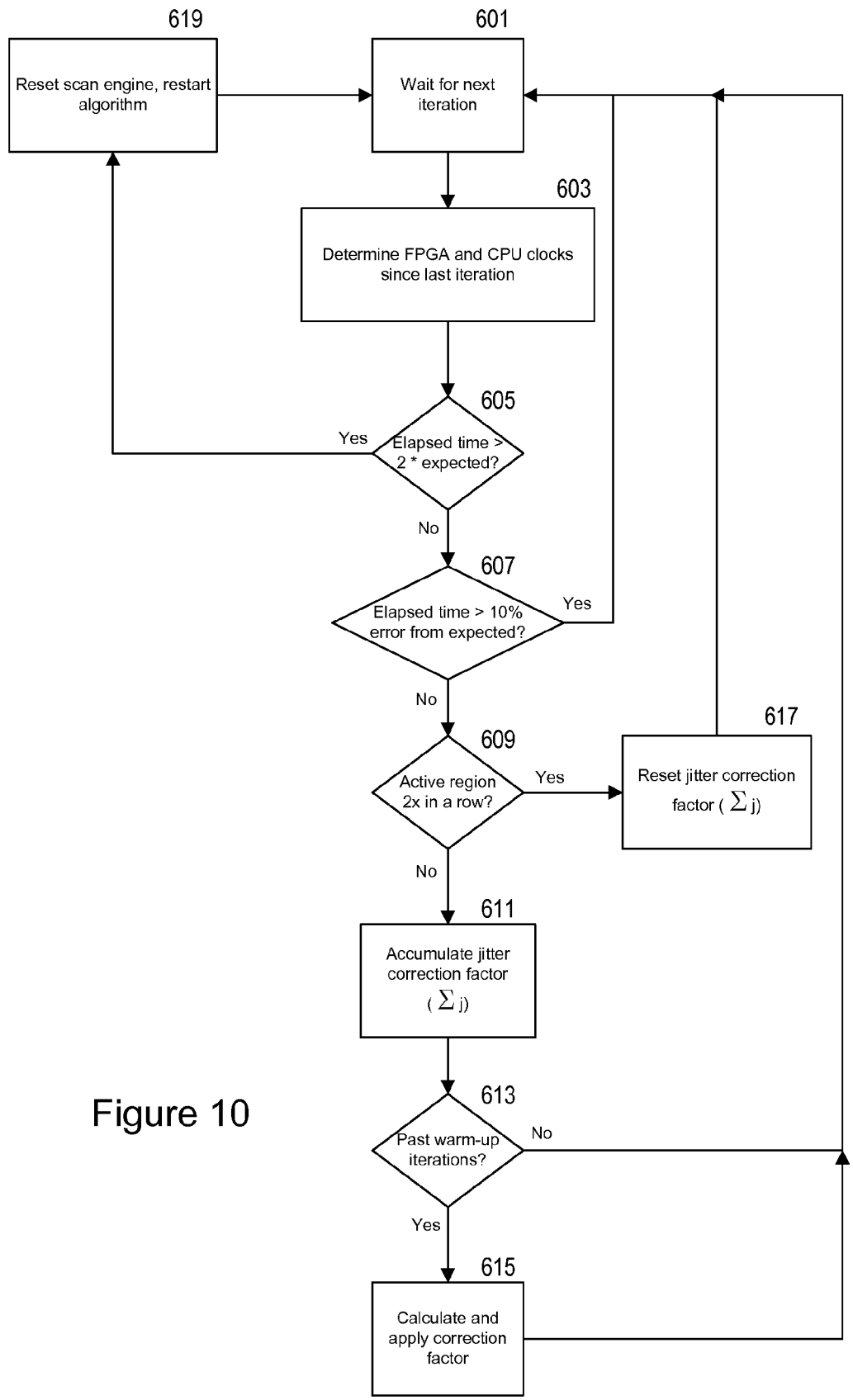
FIG. 10 is a flowchart diagram illustrating an embodiment of a synchronization algorithm which is executed by the CPU of the host computer to keep the loop performed by the FPGA of the measurement device synchronized with the loop performed by the CPU of the host computer.

FIG. 10 is a flowchart diagram illustrating one particular embodiment of the synchronization algorithm described above. The algorithm may be performed by the CPU on the host computer 102.

In block 601, the algorithm is shown waiting for the next iteration of the CPU loop to begin (e.g., waiting for the next I/O phase of the CPU loop to begin).

When the next iteration of the CPU loop begins, the algorithm may determine the number of clock ticks that have elapsed for both the FPGA clock and the CPU clock since the last iteration began, as indicated in block 603. As shown in blocks 605 and 619, if the actual elapsed time (for either clock) is off by more than a threshold error value from the expected amount of elapsed time (e.g., off by more than twice the amount of time expected to have elapsed) then the algorithm is re-started, e.g., by re-starting the loops. This may enable the synchronization algorithm to compensate for cases where the loop timing gets unexpectedly skewed by a relatively large amount due to an error in the system. The threshold error value used to determine when the loops should be re-started may be tuned to different values as desired.

As indicated in block 607, the algorithm may also perform another error check using a smaller threshold error value. In this example, the algorithm checks whether the actual elapsed time differs from the expected elapsed time by more than 10 percent. If so then the current iteration is skipped, e.g., the length of the delay phase of the FPGA loop is left unchanged, and the algorithm proceeds to block 601 to await the start of the next iteration of the CPU loop. Again, the threshold error value used in block 607 may be set to different values, as desired for a particular application.

In block 609 the algorithm determines whether the FPGA loop has been in its active phase for two iterations in a row at the time the I/O phase is entered in the corresponding iteration of the CPU loop. If so then the jitter correction factor is reset to zero. Because the precision of floating-point numbers represented in computers is finite, a long-term summation of the jitter correction factor can eventually introduce rounding errors that could adversely affect the algorithm if the rounding errors are not compensated for. Block 609 enables the algorithm to correct for accumulated rounding errors in the jitter correction factor. (As discussed above, when the I/O phase is entered in a given iteration of the CPU loop, the FPGA loop is expected to be in its delay phase. If it is in the active phase instead then the synchronization algorithm accounts for the offset error using the set point difference as described above. If the next iteration of the FPGA loop is also in the active phase when the I/O phase is entered in the next iteration of the CPU loop then the synchronization algorithm assumes that an incorrect jitter correction factor caused by a rounding error is causing the timing error, so it resets the jitter correction factor to zero.)

In block 611 the jitter correction factor is accumulated, e.g., by summing the amount of jitter measured for the current iteration of the CPU loop with the previously accumulated jitter correction factor.

In some embodiments the algorithm may perform a number of warm-up iterations at the beginning. As shown, if the warm-up iterations are not yet completed, the delay phase length is not adjusted, and control proceeds back to block 601. Otherwise, a correction factor is calculated and applied to the delay phase timer, as shown in block 615. As discussed above, the synchronization algorithm may read the FPGA cycle timer in order to determining an actual number of FPGA clock ticks that have elapsed between the time when the delay phase of the current iteration of the FPGA loop began and the time when the I/O phase of the current iteration of the CPU loop began. The synchronization algorithm may subtract the expected number of clock ticks (the set point value) from the actual number of clock ticks to determine a set point difference value for the current iteration. The set point difference value for the current iteration may be used together with the set point difference values for the past several differences to calculate a moving average. The moving average may be multiplied by a tunable proportional factor, and the result (which may be either positive or negative) may be added to the delay phase timer. In addition the synchronization algorithm may also add the jitter correction factor sum (which may also be either positive or negative) to the delay phase timer.

In various embodiments the synchronization algorithm described above may provide various advantages. For example, no special hardware (no special signals, timers, etc.) may be required to perform the synchronization between the loops. In some embodiments the synchronization may occur solely through communication between the CPU and the FPGA that occurs through a standard PCI bus on the host computer 102.

Also, in the synchronization algorithm described above, the CPU on the host computer is the master. This may be advantageous in some systems because the CPU may in turn be synchronized to other external sources (e.g., NTP servers, 1588, GPS pulse-per-second), thus allowing a network of distributed CPUs to perform control loops that remain synchronized and free of drift, while still retaining sub-microsecond jitter.

Also, the synchronization algorithm described above compensates for CPU jitter. The CPU is able to drive synchronization despite the fact that CPU jitter may typically be two orders of magnitude higher than the achieved jitter of the synchronized loop on the FPGA. The algorithm compensates for CPU jitter by taking into account its non-random nature as described above.

Furthermore, the synchronization algorithm may also be advantageous because it is efficient, e.g., because it is inexpensive in the processor power required. In some implementations the algorithm only requires about 20 microseconds to perform the necessary calculations on a 400 MHz PowerPC processor, which may be negligible overhead for control loops in the 1 kHz range.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a host computer including a processor and memory storing program instructions;
a measurement device coupled to the host computer, wherein the measurement device includes a programmable hardware element;
wherein the program instructions are executable to cause the processor of the host computer to perform a plurality of iterations of a first loop, wherein each respective iteration of the first loop includes:
an I/O phase during which the processor reads measurement data from the programmable hardware element, wherein the measurement data is acquired from a physical system coupled to the measurement device; and
a control phase during which the processor uses measurement data read from the programmable hardware element to perform an algorithm;
wherein the programmable hardware element is configured to perform a plurality of iterations of a second loop, wherein each respective iteration of the second loop includes:
an active phase during which the programmable hardware element stores measurement data acquired from the physical system in memory of the programmable hardware element; and
a delay phase during which the programmable hardware element does not store measurement data in the memory of the programmable hardware element;
wherein the program instructions are further executable to cause the processor of the host computer to synchronize the second loop performed by the programmable hardware element with the first loop performed by the processor by communicating with the programmable hardware element to adjust a length of the delay phase for one or more iterations of the second loop.

2. The system of claim 1,
wherein the program instructions are executable to cause the processor to synchronize a particular iteration of the second loop with a particular iteration of the first loop by adjusting a length of the delay phase for the particular iteration of the second loop;
wherein the program instructions are executable to cause the processor to adjust the length of the delay phase for the particular iteration of the second loop by:
determining an expected number of clock ticks of a clock of the programmable hardware element expected to have elapsed between a first time when the delay phase of the particular iteration of the second loop began and a second time when the I/O phase of the particular iteration of the first loop began;
determining an actual number of clock ticks of the clock of the programmable hardware element that have elapsed between the first time when the delay phase of the particular iteration of the second loop began and the second time when the I/O phase of the particular iteration of the first loop began;
calculating a difference between the actual number of clock ticks and the expected number of clock ticks;
using the calculated difference to adjust the length of the delay phase of the particular iteration of the second loop.

3. The system of claim 2,
wherein the programmable hardware element includes a timer controlling the length of the delay phase of the particular iteration of the second loop;
wherein using the calculated difference to adjust the length of the delay phase of the particular iteration of the second loop includes using the calculated difference to adjust the timer.

4. The system of claim 3,
wherein the calculated difference is a first set point difference for the particular iteration of the second loop;
wherein the program instructions are further executable to cause the processor to:
calculate respective set point differences for two or more iterations of the second loop prior to the particular iteration;
calculate an average of the first set point difference and the respective set point differences for the two or more iterations prior to the particular iteration; and
use the average to adjust the timer controlling the length of the delay phase of the particular iteration of the second loop.

5. The system of claim 4, wherein the program instructions are further executable to cause the processor to:
multiply the average by a proportional factor to obtain a product; and
use the product to adjust the timer controlling the length of the delay phase of the particular iteration of the second loop.

6. The system of claim 2,
wherein the program instructions are further executable to cause the processor to adjust the length of the delay phase for the particular iteration of the second loop by:
for each respective iteration of two or more iterations of the first loop performed prior to the particular iteration of the first loop, calculate a respective amount of jitter of the processor by calculating an amount of time by which an actual start time of the respective iteration of the first loop differs from an expected start time of the respective iteration of the first loop;
calculate a particular amount of jitter of the processor for the particular iteration of the first loop by calculating an amount of time by which an actual start time of the particular iteration of the first loop differs from an expected start time of the particular iteration of the first loop;
calculate a jitter correction factor as a sum of the respective amounts of jitter for the two or more iterations of the first loop;
add the particular amount of jitter for the particular iteration of the first loop to the jitter correction factor; and
use the jitter correction factor together with the calculated difference to adjust the length of the delay phase of the particular iteration of the second loop.

7. The system of claim 6, wherein the program instructions are executable to cause the processor to:
determine a number of clock ticks of the clock of the programmable hardware element corresponding to the jitter correction factor;
adjust the length of the delay phase of the particular iteration of the second loop by adding the calculated difference and the number of clock ticks corresponding to the jitter correction factor to the delay phase of the particular iteration of the second loop.

8. The system of claim 6,
wherein after causing the processor to use the jitter correction factor together with the calculated difference to adjust the length of the delay phase of the particular iteration of the second loop, the program instructions are further executable to cause the processor to:
detect an error condition; and
reset the jitter correction factor to zero in response to the error condition.

9. The system of claim 1, wherein the program instructions are executable to cause the processor to:
for each respective iteration of the one or more iterations of the second loop, adjust the length of the delay phase for the respective iteration of the second loop in response to determining that the respective iteration occurs after a particular number of warm-up iterations have been performed.

10. The system of claim 1, wherein the program instructions are executable to cause the processor to:
determine that a length of the delay phase for a particular iteration of the second loop should not be adjusted in response to determining that the particular iteration occurs before a particular number of warm-up iterations have been performed.

11. The system of claim 1,
wherein a particular iteration of the second loop corresponds to a particular iteration of the first loop;
wherein the program instructions are executable to cause the processor to determine that the length of the delay phase of the particular iteration of the second loop should not be adjusted in response to determining that an error condition has occurred.

12. The system of claim 11, wherein the program instructions are executable to cause the processor to determine that the error condition has occurred by:
determining an expected amount of elapsed time between a time when the particular iteration of the first loop starts and a time when a previous iteration of the first loop starts;
calculating an actual amount of elapsed time between the time when the particular iteration of the first loop starts and the time when a previous iteration of the first loop starts; and
determining that the actual amount of elapsed time differs by more than a particular amount from the expected amount of elapsed time.

13. The system of claim 1, wherein the program instructions are further executable to cause the processor to:
in response to determining that an error condition has occurred:
restart the first loop on the processor; and
communicate with the programmable hardware element to cause the programmable hardware element to restart the second loop.

14. The system of claim 13,
wherein a particular iteration of the second loop corresponds to a particular iteration of the first loop;
wherein the program instructions are executable to cause the processor to determine that the error condition has occurred by:
determining an expected amount of elapsed time between a time when the particular iteration of the first loop starts and a time when a previous iteration of the first loop starts;
calculating an actual amount of elapsed time between the time when the particular iteration of the first loop starts and the time when a previous iteration of the first loop starts; and determining that the actual amount of elapsed time differs by more than a particular amount from the expected amount of elapsed time.

15. The system of claim 1, wherein the programmable hardware element is a field programmable gate array (FPGA).

16. The system of claim 1, wherein the program instructions are further executable to cause the processor of the host computer to communicate with the programmable hardware element during the I/O phase of a particular iteration of the first loop to store control data for controlling the measurement device in the programmable hardware element.

17. A method comprising:
a processor of a host computer performing a plurality of iterations of a first loop, wherein the host computer is coupled to a measurement device that includes a programmable hardware element, wherein the measurement device is configured to acquire measurement data from a physical system coupled to the measurement device, wherein each respective iteration of the first loop includes:
 an I/O phase during which the processor reads measurement data from the programmable hardware element of the measurement device, wherein the measurement data is acquired from the physical system; and
 a control phase during which the processor uses measurement data read from the programmable hardware element to perform an algorithm;
wherein the method further comprises the programmable hardware element performing a plurality of iterations of a second loop, wherein each respective iteration of the second loop includes:
 an active phase during which the programmable hardware element stores measurement data acquired from the physical system in memory of the programmable hardware element; and
 a delay phase during which the programmable hardware element does not store measurement data in the memory of the programmable hardware element;
wherein the method further comprises the processor executing program instructions to synchronize the second loop performed by the programmable hardware element with the first loop performed by the processor by communicating with the programmable hardware element to adjust a length of the delay phase for one or more iterations of the second loop.

18. The method of claim 17, wherein the processor synchronizes a particular iteration of the second loop with a particular iteration of the first loop by adjusting a length of the delay phase for the particular iteration of the second loop, wherein adjusting the length of the delay phase for the particular iteration of the second loop comprises:
 determining an expected number of clock ticks of a clock of the programmable hardware element expected to have elapsed between a first time when the delay phase of the particular iteration of the second loop began and a second time when the I/O phase of the particular iteration of the first loop began;
 determining an actual number of clock ticks of the clock of the programmable hardware element that have elapsed between the first time when the delay phase of the particular iteration of the second loop began and the second time when the I/O phase of the particular iteration of the first loop began;
 calculating a difference between the actual number of clock ticks and the expected number of clock ticks; and
 using the calculated difference to adjust the length of the delay phase of the particular iteration of the second loop.

19. The method of claim 18, wherein adjusting the length of the delay phase for the particular iteration of the second loop further comprises:
 for each respective iteration of two or more iterations of the first loop performed prior to the particular iteration of the first loop, calculating a respective amount of jitter of the processor by calculating an amount of time by which an actual start time of the respective iteration of the first loop differs from an expected start time of the respective iteration of the first loop;
 calculating a particular amount of jitter of the processor for the particular iteration of the first loop by calculating an amount of time by which an actual start time of the particular iteration of the first loop differs from an expected start time of the particular iteration of the first loop;
 calculating a jitter correction factor as a sum of the respective amounts of jitter for the two or more iterations of the first loop;
 adding the particular amount of jitter for the particular iteration of the first loop to the jitter correction factor; and
 using the jitter correction factor together with the calculated difference to adjust the length of the delay phase of the particular iteration of the second loop.

20. A non-transitory computer-accessible storage medium storing program instructions executable by a host computer including a processor to:
 cause the processor of the host computer to perform a plurality of iterations of a first loop, wherein each respective iteration of the first loop includes:
  an I/O phase during which the processor reads measurement data from a programmable hardware element of a measurement device coupled to the host computer, wherein the measurement data is acquired from a physical system coupled to the measurement device; and
  a control phase during which the processor uses measurement data read from the programmable hardware element to perform an algorithm;
wherein the programmable hardware element is configured to perform a plurality of iterations of a second loop, wherein each respective iteration of the second loop includes:
 an active phase during which the programmable hardware element stores measurement data acquired from the physical system in memory of the programmable hardware element; and
 a delay phase during which the programmable hardware element does not store measurement data in the memory of the programmable hardware element;
wherein the program instructions are further executable to cause the processor of the host computer to synchronize the second loop performed by the programmable hardware element with the first loop performed by the processor by communicating with the programmable hardware element to adjust a length of the delay phase for one or more iterations of the second loop.

21. A measurement device, comprising:
one or more inputs for acquiring measurement data, wherein the measurement data is acquired from a physical system coupled to the measurement device;
a programmable hardware element; and
one or more ports for coupling to a host computer, wherein the host computer is configured to perform a plurality of iterations of a first loop, wherein each respective iteration of the first loop includes an I/O phase during which the host computer reads measurement data from the programmable hardware element and a control phase during which the host computer uses measurement data read from the programmable hardware element to perform an algorithm;
wherein the programmable hardware element is configured to perform a plurality of iterations of a second loop, wherein each respective iteration of the second loop includes:
an active phase during which the programmable hardware element stores measurement data acquired from the physical system in memory of the programmable hardware element; and
a delay phase during which the programmable hardware element does not store measurement data in the memory of the programmable hardware element;
wherein the programmable hardware element includes a timer used to synchronize the second loop performed by the programmable hardware element with the first loop performed by the host computer by adjusting a length of the delay phase for one or more iterations of the second loop, wherein the timer is controlled by the host computer.

* * * * *